(12) United States Patent
Rogers et al.

(10) Patent No.: US 7,764,665 B2
(45) Date of Patent: Jul. 27, 2010

(54) REAL-TIME NETWORK SCHEDULED PACKET ROUTING SYSTEM

(75) Inventors: Steven A. Rogers, Alton, NH (US); Scott Ball, Newmarket, NH (US); Joseph Greenwald, Madbury, NH (US)

(73) Assignee: Avaya Inc., Basking Ridge, NJ (US)

( * ) Notice: Subject to any disclaimer, the term of this patent is extended or adjusted under 35 U.S.C. 154(b) by 1794 days.

(21) Appl. No.: 10/162,454

(22) Filed: Jun. 4, 2002

(65) Prior Publication Data

US 2002/0191592 A1 Dec. 19, 2002

Related U.S. Application Data

(60) Provisional application No. 60/295,943, filed on Jun. 5, 2001, provisional application No. 60/296,238, filed on Jun. 6, 2001.

(51) Int. Cl.
*H04L 12/66* (2006.01)
*H04L 12/28* (2006.01)

(52) U.S. Cl. ............... 370/352; 370/386; 370/400

(58) Field of Classification Search ............ 370/351, 370/352, 355, 356, 357, 375, 389, 400, 386, 370/395.4, 395.21
See application file for complete search history.

(56) References Cited

U.S. PATENT DOCUMENTS

| | | | |
|---|---|---|---|
| 5,539,815 A * | 7/1996 | Samba | 379/221.07 |
| 6,044,367 A | 3/2000 | Wolff | 707/2 |
| 6,092,113 A * | 7/2000 | Maeshima et al. | 709/230 |
| 6,141,325 A * | 10/2000 | Gerstel | 370/238 |
| 6,230,200 B1 | 5/2001 | Forecast et al. | 709/226 |
| 6,246,702 B1 | 6/2001 | Fellman et al. | 370/503 |
| 6,519,263 B1 * | 2/2003 | Huth | 370/444 |
| 6,611,519 B1 * | 8/2003 | Howe | 370/386 |
| 6,647,208 B1 * | 11/2003 | Kirby | 398/45 |
| 6,954,426 B2 * | 10/2005 | Suominen | 370/230 |
| 2001/0053149 A1 * | 12/2001 | Mo et al. | 370/389 |
| 2003/0016679 A1 * | 1/2003 | Adams et al. | 370/401 |

* cited by examiner

*Primary Examiner*—Pankaj Kumar
*Assistant Examiner*—Saba Tsegaye
(74) *Attorney, Agent, or Firm*—Chapin IP Law, LLC

(57) ABSTRACT

A system for guaranteeing bandwidth for transmitting data in a network. A path generation engine determines a data paths across a network according to preselected criteria. A scheduling engine determines schedule appointments for data packets to traverse each link in the network including compensation for transmission delays and switch latencies. Scheduling data is communicated to schedule-aware switches and endpoints so that appointment times are reserved for transmission of the scheduled data packets. Real-time transmission of data can be guaranteed in both directions along the transmission path.

14 Claims, 21 Drawing Sheets

SCHEDULED PACKET SWITCH ARCHITECTURE BLOCK DIAGRAM

TABLE 301 EXAMPLE SWITCH CONNECTION MATRIX

| NODE | A1 | A2 | A3 | B1 | B2 | B3 | C1 | C2 | D1 | D2 | D3 | E1 | E2 | E3 | F1 | F2 | F3 | F4 |
|---|---|---|---|---|---|---|---|---|---|---|---|---|---|---|---|---|---|---|
| A1 |  | ? | ? |  |  |  |  |  |  |  |  |  |  |  |  |  |  |  |
| A2 | ? |  | ? |  |  |  | ? |  |  |  |  |  |  |  |  |  |  |  |
| A3 | ? | ? |  |  |  |  |  |  |  |  |  |  |  |  | ? |  |  |  |
| B1 |  |  |  |  | ? | ? |  |  |  |  |  |  |  |  |  |  |  |  |
| B2 |  |  |  | ? |  | ? |  |  |  |  |  | ? |  |  |  |  |  |  |
| B3 |  |  |  | ? | ? |  |  |  |  |  |  |  |  | ? |  |  |  |  |
| C1 |  |  |  |  |  |  |  | ? |  |  |  |  |  |  |  |  |  |  |
| C2 |  |  |  |  |  |  | ? |  |  |  |  |  |  |  |  |  | ? |  |
| D1 |  |  | ? |  |  |  |  |  |  | ? | ? |  |  |  |  |  |  |  |
| D2 |  |  |  |  |  |  |  |  | ? |  | ? | ? |  |  |  |  |  |  |
| D3 |  |  |  |  |  |  |  |  | ? | ? |  |  |  |  |  |  |  |  |
| E1 |  |  |  |  |  |  |  |  |  | ? |  |  | ? | ? |  |  |  |  |
| E2 |  |  |  |  |  |  |  |  |  |  |  | ? |  | ? |  |  |  |  |
| E3 |  |  |  |  |  | ? |  |  |  |  | ? | ? | ? |  |  |  |  |  |
| F1 |  |  |  |  |  |  |  |  |  |  |  |  |  |  |  | ? | ? | ? |
| F2 |  |  |  |  |  |  |  |  |  |  |  |  |  |  | ? |  | ? | ? |
| F3 |  |  |  |  |  |  |  | ? |  |  |  |  |  |  | ? | ? |  | ? |
| F4 |  |  |  |  |  | ? |  |  |  |  |  |  |  |  | ? | ? | ? |  |

FIG. 9

REAL-TIME NETWORK SCHEDULED PACKET ROUTING SYSTEM

RELATED APPLICATIONS

This application claims priority from U.S. Provisional Application No. 60/295,943, filed Jun. 5, 2001 and U.S. Provisional Application No. 60/296,238, filed Jun. 6, 2001.

BACKGROUND OF THE INVENTION

The present invention relates generally to a software and hardware system that provides the scheduled delivery of Internet Protocol data packets through a network so that they are not interrupted by other packets that are utilizing the same network. Additionally, the currently disclosed system guarantees the transmission, routing and reception of IP data packets through a computer network such that the packet delivery can meet the strict delay and bandwidth requirements of real-time and near real-time application uses for the Internet, Telephone, and other types of computer networks.

The present disclosure presents an advancement in the sate-of-the-art for real-time data packet switching networks using end-points such as telephones, personal computer systems, large enterprise servers, Internet appliances or any other general or special purpose data storage or data collection device.

Many organizations have had a longstanding desire to migrate real-time applications from expensive, proprietary systems and networks to the rapidly expanding Internet Packet-based (IP) technologies. Examples of such applications are factory automation, industrial process control, data acquisition for synthetic aperture radar systems (SAR), instrumentation and monitoring systems. Additionally, the disclosed invention will support all application areas using voice over IP (VoIP) and video on demand. Such applications place a high premium on real-time packet delivery, as both types of applications will deliver unacceptable levels of quality when the real-time requirements cannot be met.

Real-time applications fall into two primary groups: those that respond in "hard" real-time, and the others in "soft" real-time. These are applications with less severe requirements. It is the general nature of such a system to modify a process based on the measurements from that process. This has serious implications for both the operating system and the network that is used to collect and distribute data. A hard real-time operating system must provide a response to some kind of event within a specified and precise time window. This response must be predictable and independent of other activities undertaken by the operating system. Providing this response implies that system calls will have a specified, measured latency period. Hard real-time systems often employ specific hardware devices with special device drivers. The IEEE instrumentation buses are an example. While the IEEE bus can meet the real-time constraints for most if not all applications, it is limited in length and the separation between the devices that can be attached to the bus. It can be observed that regardless of the responsiveness of the operating system, the data network (or bus) must be able to receive or transmit data for the operating system within the same real-time constraints. Standard IP networks have not been able to satisfy the hard real-time requirements of most hard real-time applications.

By contrast, a soft real-time operating system is one that has less severe constraints on "lateness," but still must operate quickly within fairly consistent time constraints. That is, it must be good enough to service events so that the response should be satisfied, on average. Most off-the-shelf industry standard operating systems meet this definition. Depending on the application, IP networks can at times meet this constraint but are not predictable in performance without special Quality of Service features and perhaps, over provisioning the network. It is commonly understood that as soon as the bandwidth of such a network is fully saturated, the "next" IP data packet will cause the network to become non-deterministic in terms of response time and overall performance.

It can be seen that within both hard and soft real-time systems, there are two fundamental requirements for real and near-real-time computer-based systems. First, the computer's operating system software must be responsive enough to support software applications that must execute tasks against a precise schedule. Second, the network, which usually interconnects a number of supporting peripheral subsystems, must be able to deliver data packets to and from the software application in a timely enough fashion as to not violate the real or near real-time constraints implicitly or explicitly imposed by the application.

For example, for a SAR unit, the network must be able to transmit the current radar image to a signal-processing computer where it will be analyzed. This operation, although highly simplified for this example, must be completed before the SAR presents another image for processing. It is understood by those schooled in the art that regardless of the performance of the computer system, if the network does not transfer the SAR data fast enough for the analysis to complete, or vice-versa, important data that may be contained in the next SAR scan will be lost.

In many hard real-time systems, a special purpose Real-time Operating System (RTOS) may be employed. A RTOS is a special multi-tasking control system specifically designed to guarantee execution of a software program on a programmable but very specific time schedule. An RTOS must also be very responsive to data that may be presented, on a scheduled or unscheduled basis, to the system for processing. It is thus imperative that the network used to collect and distribute data from a RTOS have the ability to be just as responsive and predictable. It is commonly understood that Ethernet and IP packet switching systems are in fact, not consistently responsive or predictable in terms of their scheduled delivery of data packets. These classes of switches, despite substantial advances in delivered bandwidth, suffer from unpredictability due to packet collisions and variable packet delays.

For example, problems will almost certainly arise when multiple applications or even multiple threads within a single application, compete for a single port's resources on an instantaneous basis. Most likely, these applications and threads will interfere with each other, causing variable delays to occur in the transmission or reception of one or more packets. Some system designers have attempted to mitigate this problem by installing multiple network interface cards in the host computer (called multi-homing). This technique does reduce packet collisions and variable packet delays as compared to a single network interface card but bandwidth issues will eventually reappear when the high-speed network interface cards deplete the host's I/O bus' available bandwidth.

Typically, traditional network switching equipment is not able to meet the real-time constraints that define a real-time or near-real-time application.

In existing systems, attempts have been made to address these problems by assigning priorities to packets of different types. In such existing techniques, packets with real-time needs may be assigned a relatively higher priority, so that they are processed before lower priority packets that do not need real-time delivery. Unfortunately, prioritized packet processing does not improve performance in the case where all packets have equivalent priorities. An example of an application in which this scenario arises is voice telephony. In general, many simultaneous telephone calls may be transported on a single port connection. It is not typically known which, if any, of the packets carrying data for such telephone calls should be given higher priority. When multiple priority voice packets are mixed in a single channel, non-deterministic packet congestion and delay may result that is disruptive to a telephone call.

One should not confuse the present disclosed invention with the Real Time Protocol (RTP) commonly used in IP networks. RTP provides end-to-end delivery services for applications such as those previously listed. RTP services include payload type identification, sequence numbering, time-stamping and delivery monitoring. RTP also supports data transfers to multiple destinations using multicast distribution if provided by the underlying network. While this type of broadcast mechanism can significantly increase the effective instantaneous performance of the network, multicasting provides very limited to no benefit in point to point applications such as those found in telecommunications. Note that RTP itself does not and cannot provide any mechanism to ensure timely delivery or provide other quality-of-service guarantees. RTP relies on lower-layer services to do so. It also does not guarantee packet delivery or prevent out-of-order packet delivery. RTP makes no assumption that the underlying network is reliable or that it delivers packets in sequence. The packet sequence numbers included in RTP are perhaps useful for the reconstruction of the sender's packet sequence or to determine the proper location of a packet, for example in video decoding, without necessarily decoding packets in sequence.

The features articulated for RTP, while allowing for an efficiency of processing packets post delivery, provide no guarantees that packet delivery will remain within the constraints of a hard real-time system.

BRIEF SUMMARY OF THE INVENTION

In accordance with principles of the invention, a real-time packet switching system is disclosed herein that is capable of allocating bandwidth to each one of multiple real-time applications or each one of multiple real-time application processing threads within a multi-tasking operating system such that packet delay is controlled and guaranteed packet delivery is provided. The disclosed system provides guaranteed bandwidth allocation that alleviates transmission problems caused by bandwidth contention. The disclosed system allocates bandwidth for use during respective real time communication sessions. Operation of the disclosed bandwidth allocation system does not degrade the packet switching performance of other packet traffic except to the extent that available bandwidth on the affected ports is decreased.

The present disclosure includes a scheduling system which may be added to a conventional packet switch architecture. The disclosed packet scheduling system provides software interfaces to allow an application to request a scheduled path as well as have the Scheduling Software and switch hardware dynamically construct and maintain a scheduled path. Such scheduling is applied separately to the transmit and receive functions within each port of a switch. The disclosed real-time packet scheduling system is able to operate in accordance with the real-time as well as non real-time needs of kernel and user level operations within any multi-user, multi-tasking, special purpose or real-time software operating system, or any software application in terms of guaranteed bandwidth and controlled delay. Additionally, the present disclosure may be applied to any IP based communications medium including wireless.

For the purposes herein, the term Real-Time Packet Switching System refers to a set of unique hardware and software modules that, when used with schedule aware end points (SEPs,) also referred to herein as "SEDs", schedule aware end devices, will allow two or more of those end points to communicate, with real-time characteristics, over an IP network such that bandwidth is guaranteed and network delays are controlled and deterministic. A SEP can be any device capable of transmitting and receiving packets on a scheduled time table as calculated and dictated by a Schedule Agent. Some examples of SEPs are IP telephones, industry standard servers, desk top PC Clients, network storage systems and various network.

Note that the system according to the invention described herein, is generalized to the notion of moving IP data packets from one end point to one or more other end points. In general it is not important to the system as to what type of end points are configured. As long as the end points adhere to the fundamental specifications for the transmission and reception of scheduled IP packets, the system will transport packets at maximum bandwidth with controlled delays until all resources are used. Additionally, the system described herein is not sensitive to various IP overlaying technologies such as Voice over IP (VoIP) or Digital Video over IP (DVoIP).

For the purposes herein, the term "packet flow" is used to refer to those packets associated with a specific application. A packet flow is further considered herein to refer to a unidirectional flow of packets between a transmitting host and a receiving host that is associated with an application. Within each switch, the disclosed scheduling system is based on the occurrence of schedules. Schedules are expected time periods during which packet transmissions and/or receptions for one or more packet flows.

Schedules are provisioned independently at each link within each switch within the network. A given schedule applies independently to the transmit and receive functions of all links, or a subset of links, within a switch, or to a subset of the transmit and/or receive functions of one or more links within a switch. Accordingly, a given link may operate based on a single schedule, or on multiple schedules. Schedules may operate once or be repeated continuously. Alternatively, each schedule may be triggered explicitly in response to an event.

Within a schedule interval, packet flow offsets define the beginnings of packets or packet groups associated with packet flows. These offsets are also called appointments. In the case where a packet flow offset is associated with the transmit function of a link, that packet flow offset defines a time within a schedule interval at which transmission of one or more packets for the associated packet flow may be initiated. In the case where a packet flow offset is associated with a receive function of a link, that packet flow offset defines a point in time within a schedule interval at which reception of one or more packets for the associated packet flow may be expected. For a given packet flow, different packet flow offsets are established for each link along the path between endpoints. The set of offset values associated with a packet flow for all links along such a path defines the schedule for that packet flow (also referred to as a "packet flow schedule").

A packet flow schedule may also include a schedule interval duration and packet length. A time period within the schedule interval associated with a given packet flow schedule is referred to as the packet flow schedule period. Individual packet flow schedules are determined based on the needs of the application associated with the packet flow, and a computed best transit path through the network. Packet flow schedules can be granted to any application, up to the bandwidth limitations of the relevant communications channel. A packet flow schedule associated with an application guarantees that application time during which it can place one or more packets into a transmission path. Packet flow schedules can be allocated to any application in any order or sequence, until all of the transmission time for the channel is allocated. Any unallocated transmission opportunities may be used to transport conventional packet traffic, which may be switched and forwarded as in existing systems.

When a packet flow is established, the associated packet flow schedule is coordinated between the links along the path between the endpoints for that packet flow. Based on this packet flow schedule, a given link may transmit a guaranteed bandwidth packet for the packet flow based on the packet flow schedule to the next link along the path to the receiving host. Also based on this packet flow schedule, the next link will expect the arrival of the guaranteed bandwidth packet at a time indicated by the packet flow schedule. In this way, based on the formation of the packet flow schedule across the links within the path, dedicated bandwidth is provided between any given set of endpoints.

Accordingly, when a link forwards a packet (transmits), based on the packet flow schedule, the packet is automatically transmitted, without delay, to the next link's receiver. For any given link, a given packet flow schedule is active for that link through the switch, in one direction only. Thus, each link may have two dedicated schedule intervals, one for the transmit function and one for the receive function. For the real-time session to be established, the packet flow offsets associated with transmitting packets and the packet flow offsets associated with receiving packets will coincide, through each link along the path. The set of packet flow offsets associated with a given packet flow, across the set of switches along the path for that packet flow is also sometimes referred to herein as the "packet itinerary" for that packet flow.

Guaranteed bandwidth packets that are transmitted using the disclosed scheduling system are referred to as "scheduled" packets. Included in the computation of flow schedules are the delays associated, with the transmission path and with the switching systems within the switches themselves. The disclosed system requires that an endpoint transmitter be able to coordinate its transmissions with all the links along the path to the endpoint receiver. Each link carrying a scheduled packet must be schedule coordinated with the next link along the path to the endpoint receiver for the associated packet flow.

Negotiation or coordination with the last link in the path is not required of the endpoint receiver. The last link in the path only sends the endpoint receiver packets according to the packet flow schedules associated with that endpoint. Since the endpoint receiver receives all of its packets from the last link in the path, that same link will control the delivery of all packets to that receiver. Thus, the endpoint receiver does not generally need to coordinate schedule information. The endpoint receiver will always receive guaranteed bandwidth packets at the correct time.

The endpoint receiver may normally derive any application timing information it needs to schedule the playing of the information contained in the real-time packets, from the packets themselves. Guaranteeing packet delivery times greatly reduces the need to maintain large packet jitter buffers, to counter jitter or even packet collision and retransmission problems. Since the endpoint receiver always receives the next packet in the sequence, on time, it does not require extensive jitter buffering.

Real time packet flows between switches are accomplished by coordinating schedules between switches. This inter-switch coordination is accomplished by means of a special application that computes and delivers schedules between switches. This application must have knowledge of schedule flows, the delays in switches and in the links between switches, the link speeds, and the network topology. When the schedule application receives a request it can thus compute the fastest schedule through the network of switches for the packet flow.

BRIEF DESCRIPTION OF THE DRAWING

The accompanying drawings, referred to herein and constituting a part hereof, illustrate the exemplary embodiments of the system and method for real-time network scheduled packet routing of the present invention and, together with the description, serve to explain the principals of the invention.

A Schedule Aware Endpoint (SEP) is any IP compatible network device that is capable of transmitting and receiving data packets to a precisely contrived schedule.

A Schedule Agent (SA) is a software application that is hosted by a general-purpose computer. The SA is responsible for pre-configuring the Scheduled switches such that they operate on a precise schedule for particular data packets.

The Scheduled Switches (A), (B), and (C), are special IP Packet switches that can maintain a precise schedule for receiving and forwarding packets as determined by the SA. The Scheduled Switches are interconnected through their various links as indicated.

Figure 2:
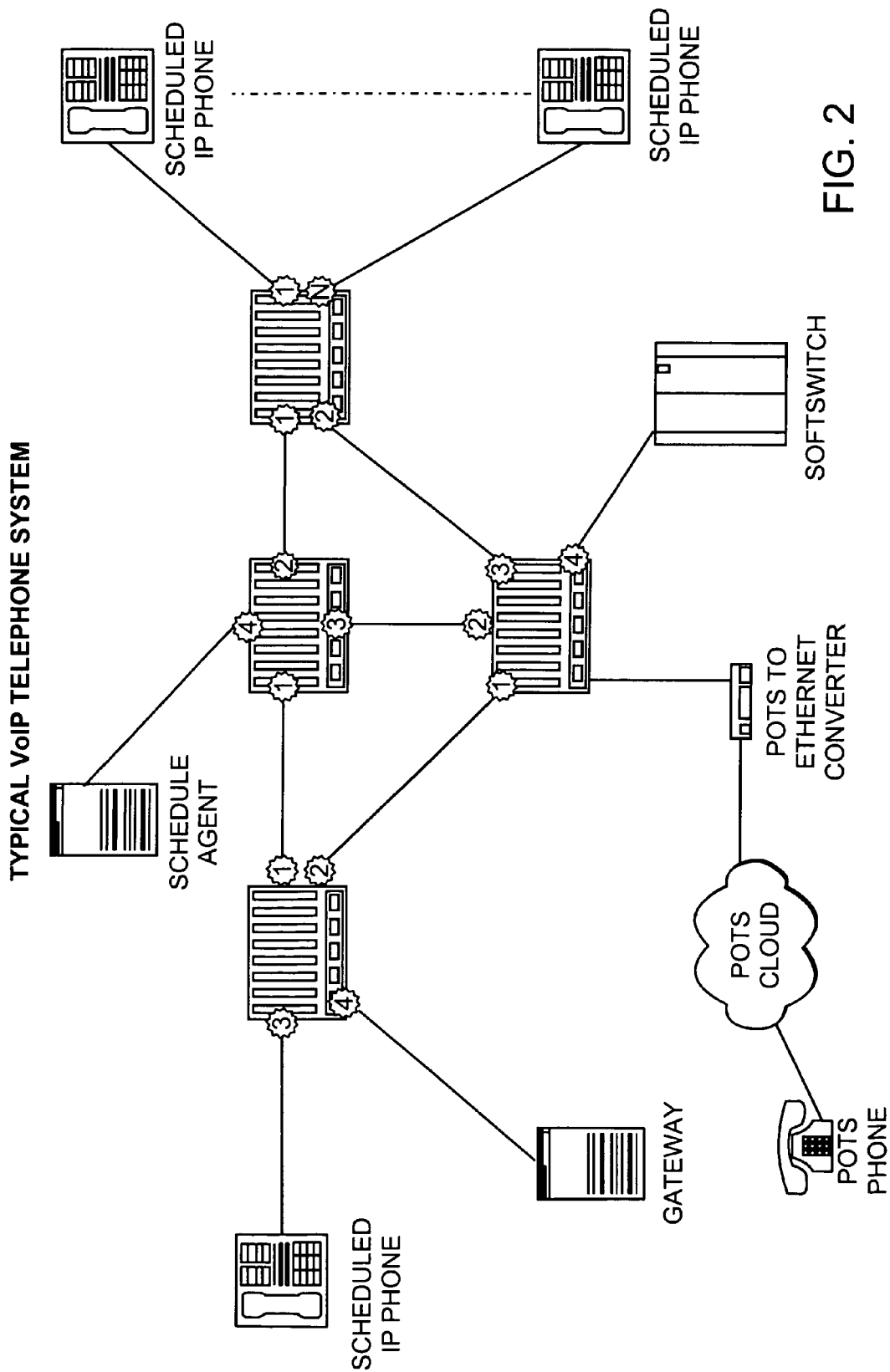

FIG. 2 shows a high-level block diagram of the disclosed Packet Scheduling System with a Scheduling Agent, two Schedule Aware Endpoints (SEPs), and a switched network. Note that this illustration shows the disclosed invention applied to a typical Voice over IP telephone application.

Figure 3:
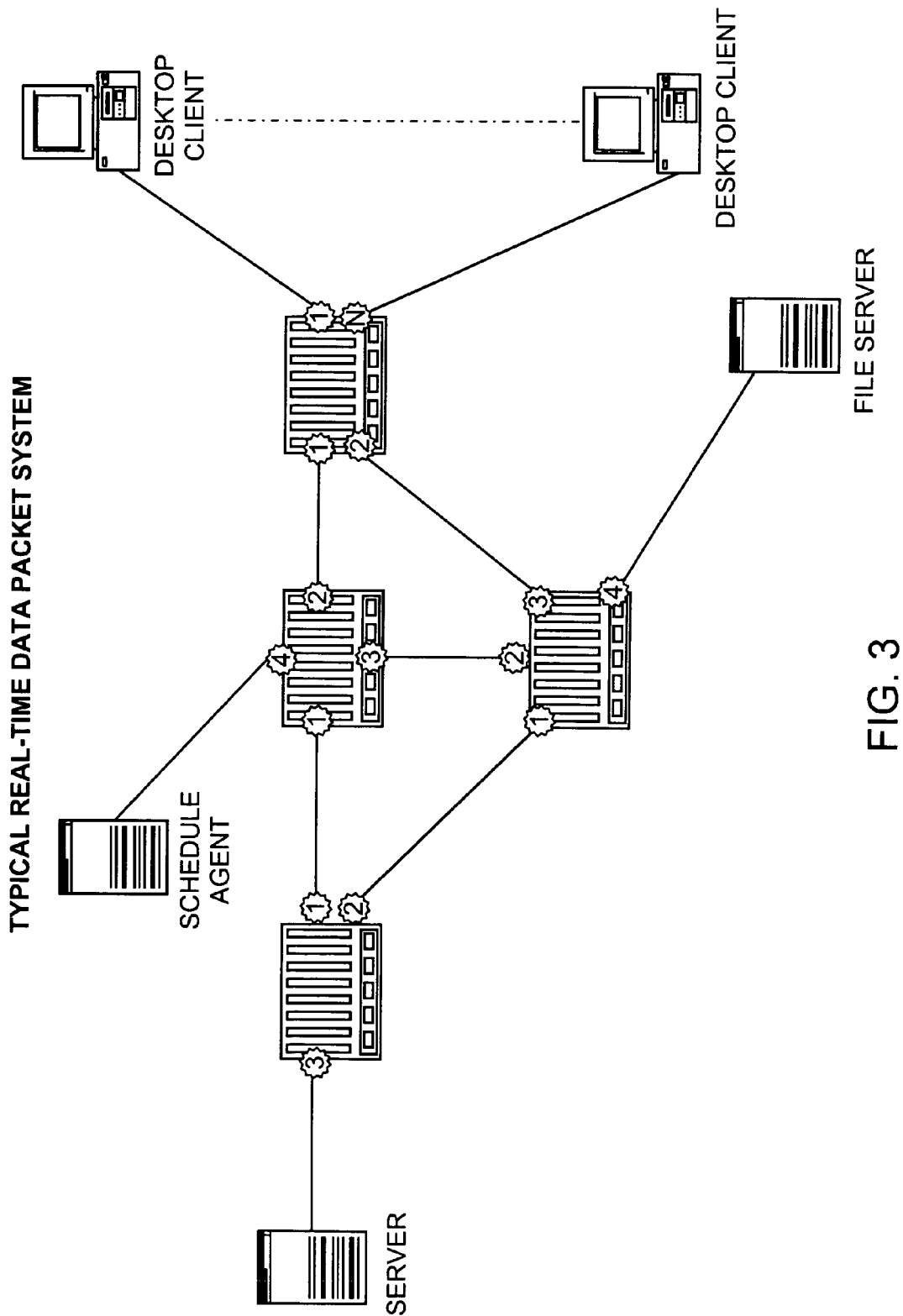

FIG. 3 shows a high-level block diagram configuration representing a computer data packet network. For a data packet system, the configuration shows a typical client server architecture where various desktop clients are serviced by an application server and a file server.

Figure 4:
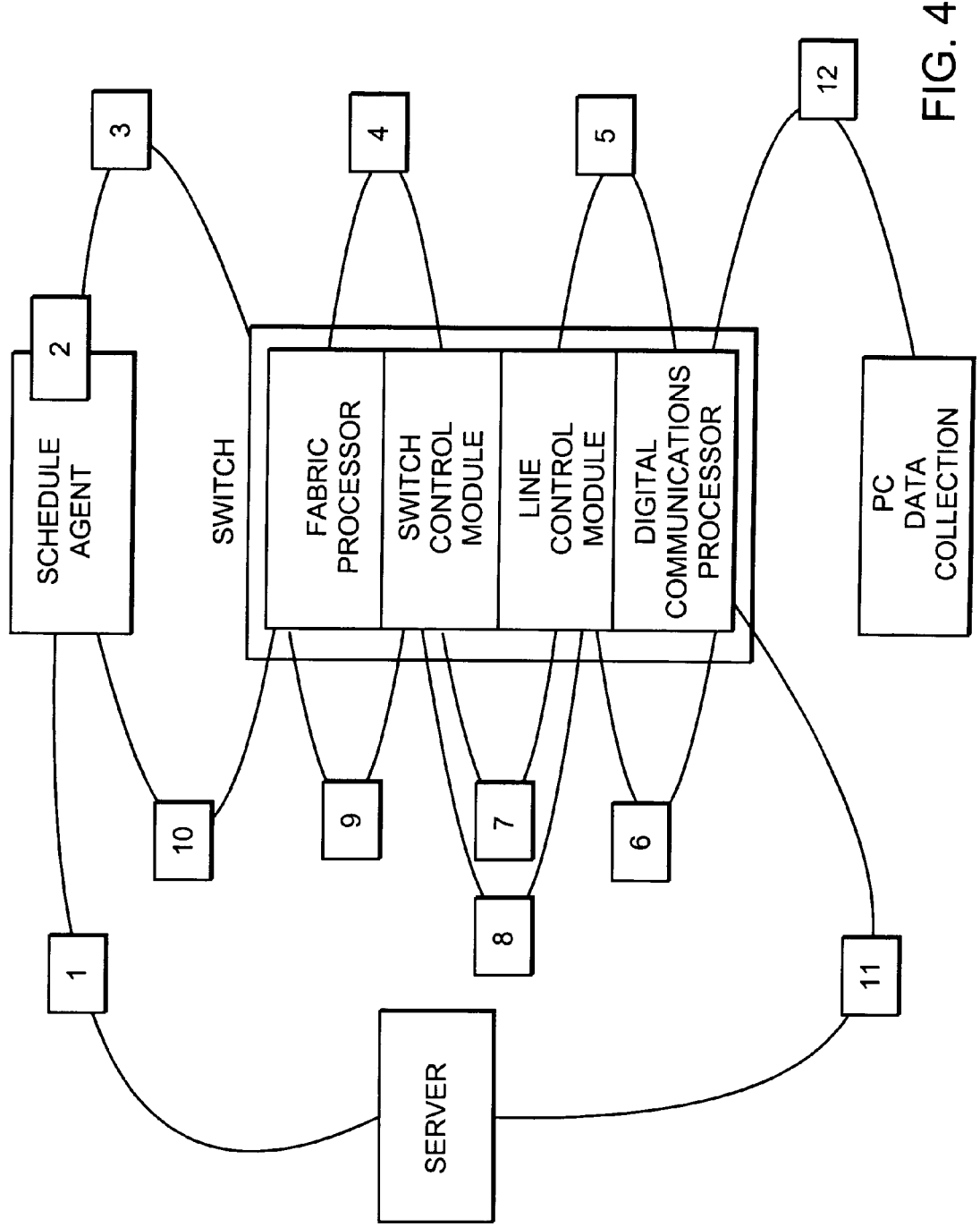

FIG. 4 is a more detailed block diagram showing a single switch architecture with more emphasis placed on the hardware subsystems within the Scheduled Switch.

Figure 5:
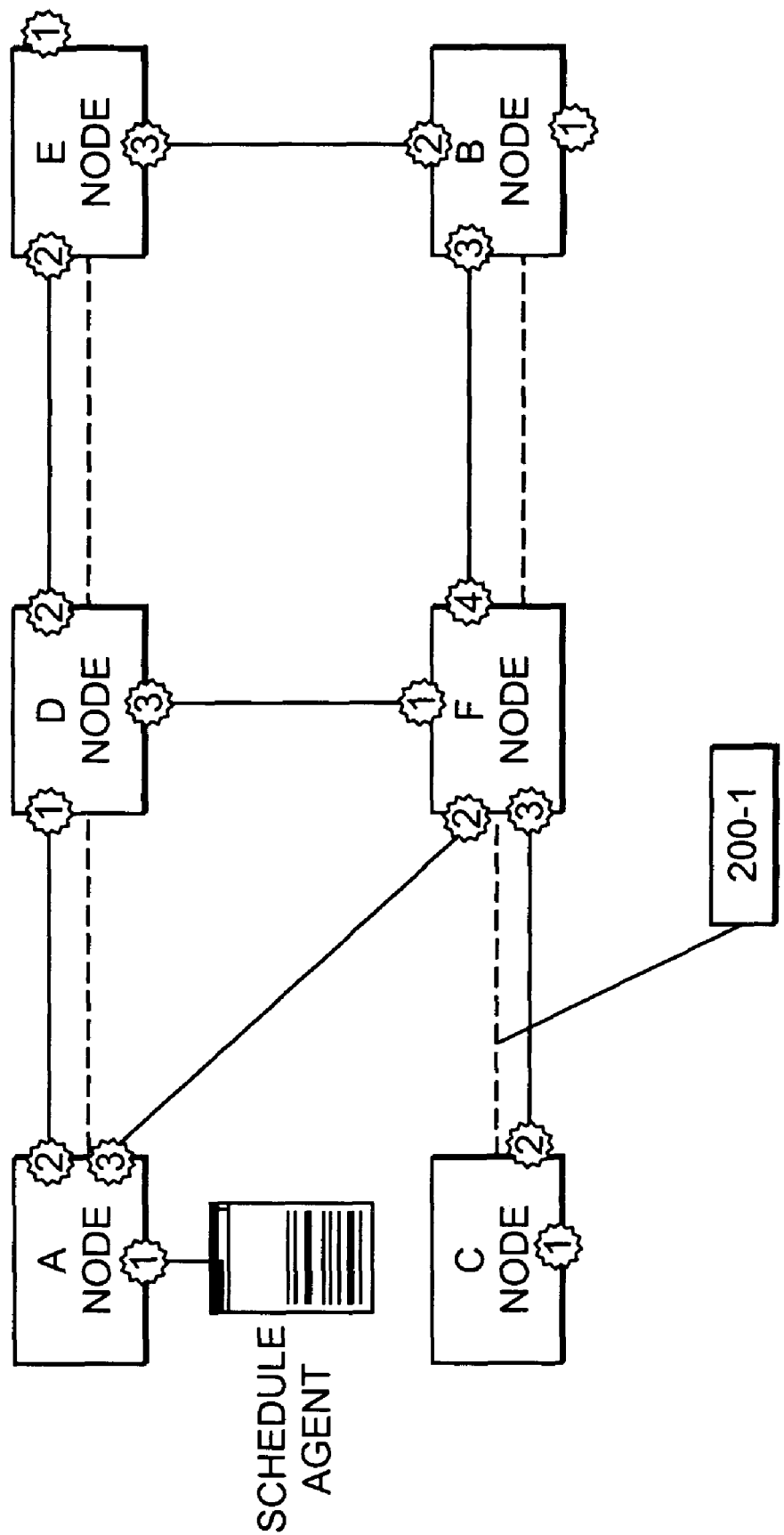

FIG. 5 shows a typical six node network of Scheduled Switches. The dotted line represents the heartbeat signal that is used to coordinate all of the nodes so they may operate synchronously to a common time reference.

Figure 6:
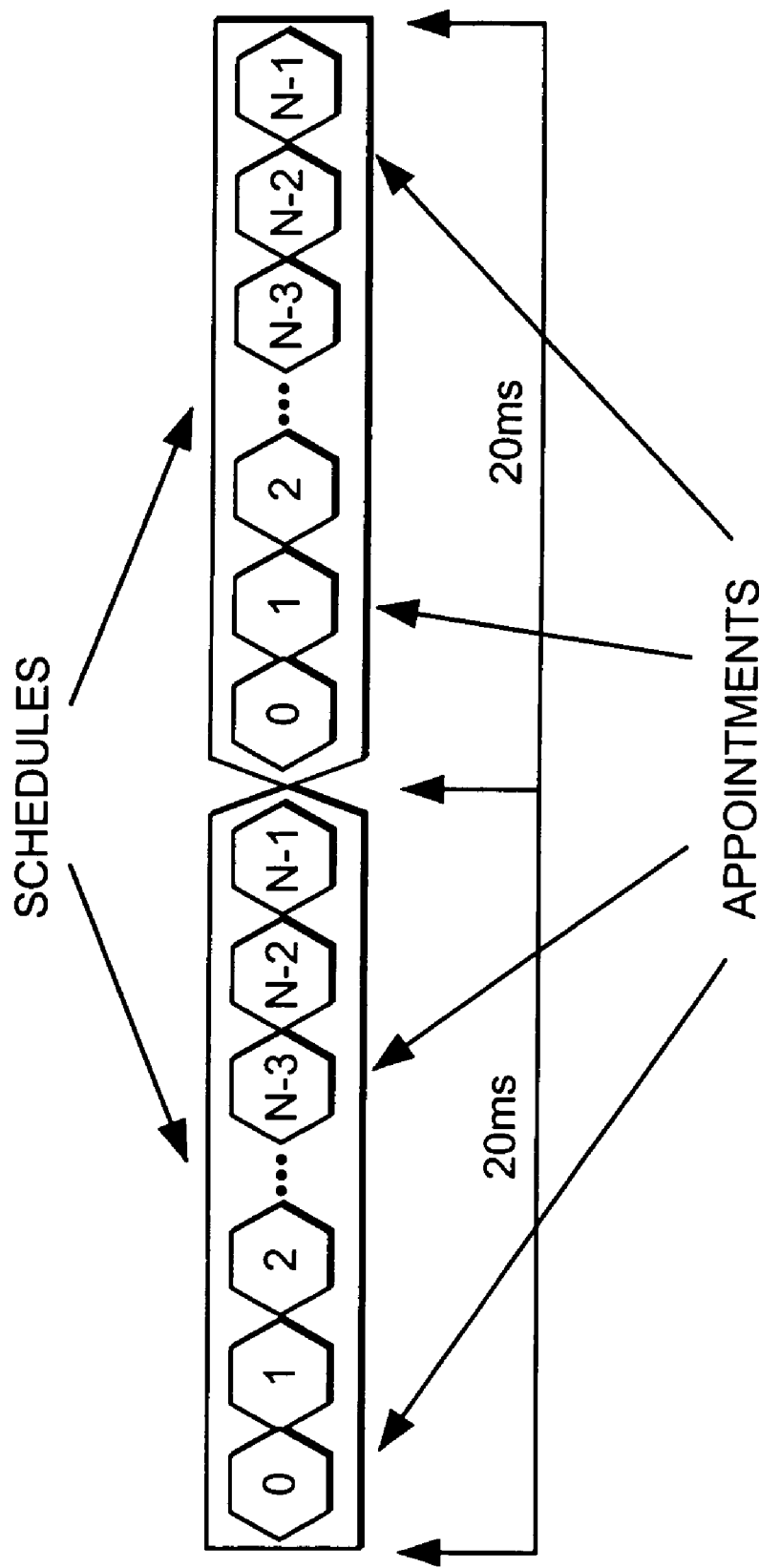

FIG. 6 shows the construction of an appointment schedule used within by the Scheduled Switch. The illustration shows two 20-millisecond schedules of appointments.

Figure 7:
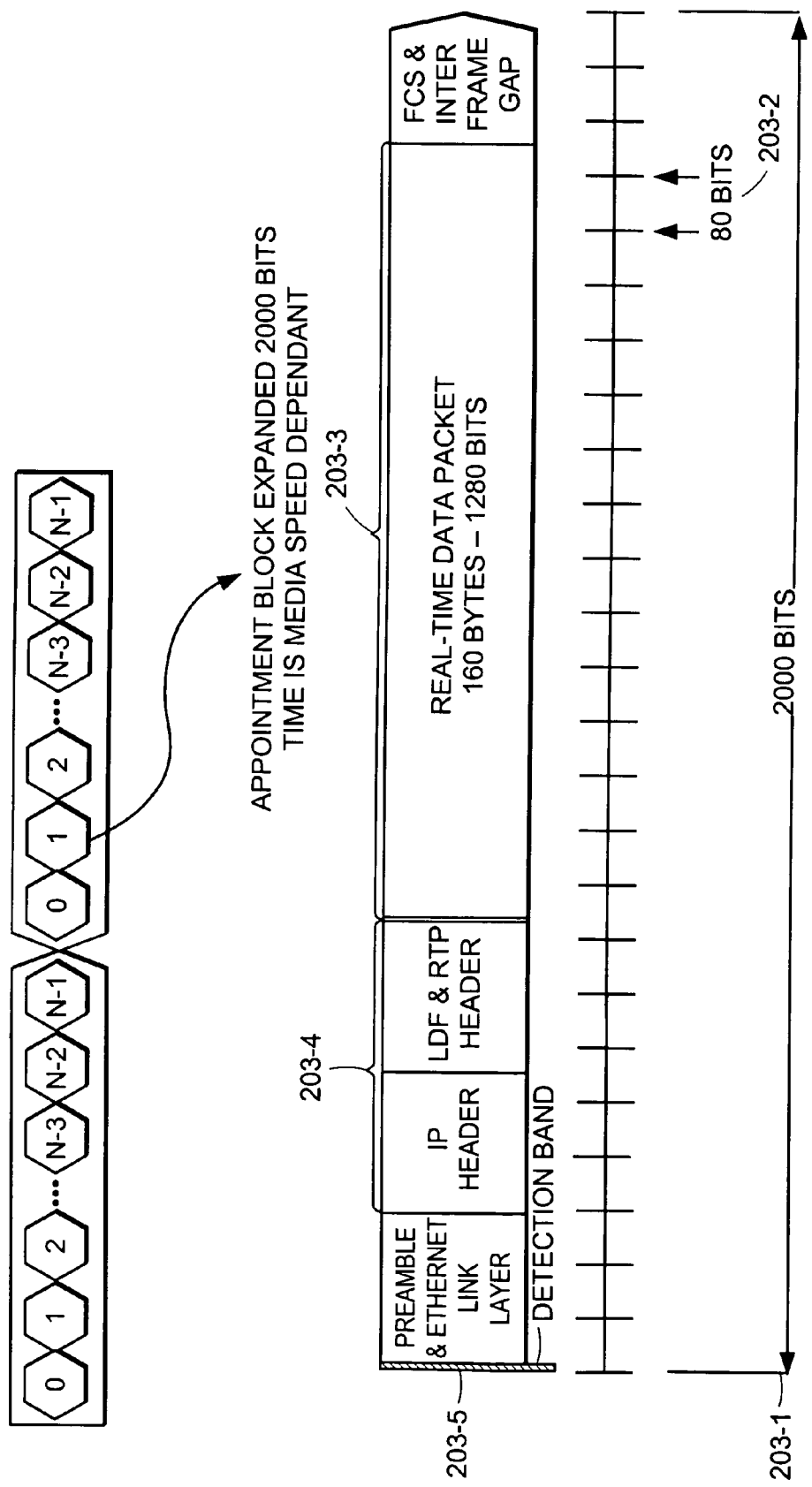

FIG. 7 illustrates the detailed construction of a single appointment consisting of, a Detection Band, IP, UDP, and RTP Headers, Real Time Data Packet, and the FCS and Interframe gap.

Figure 8:
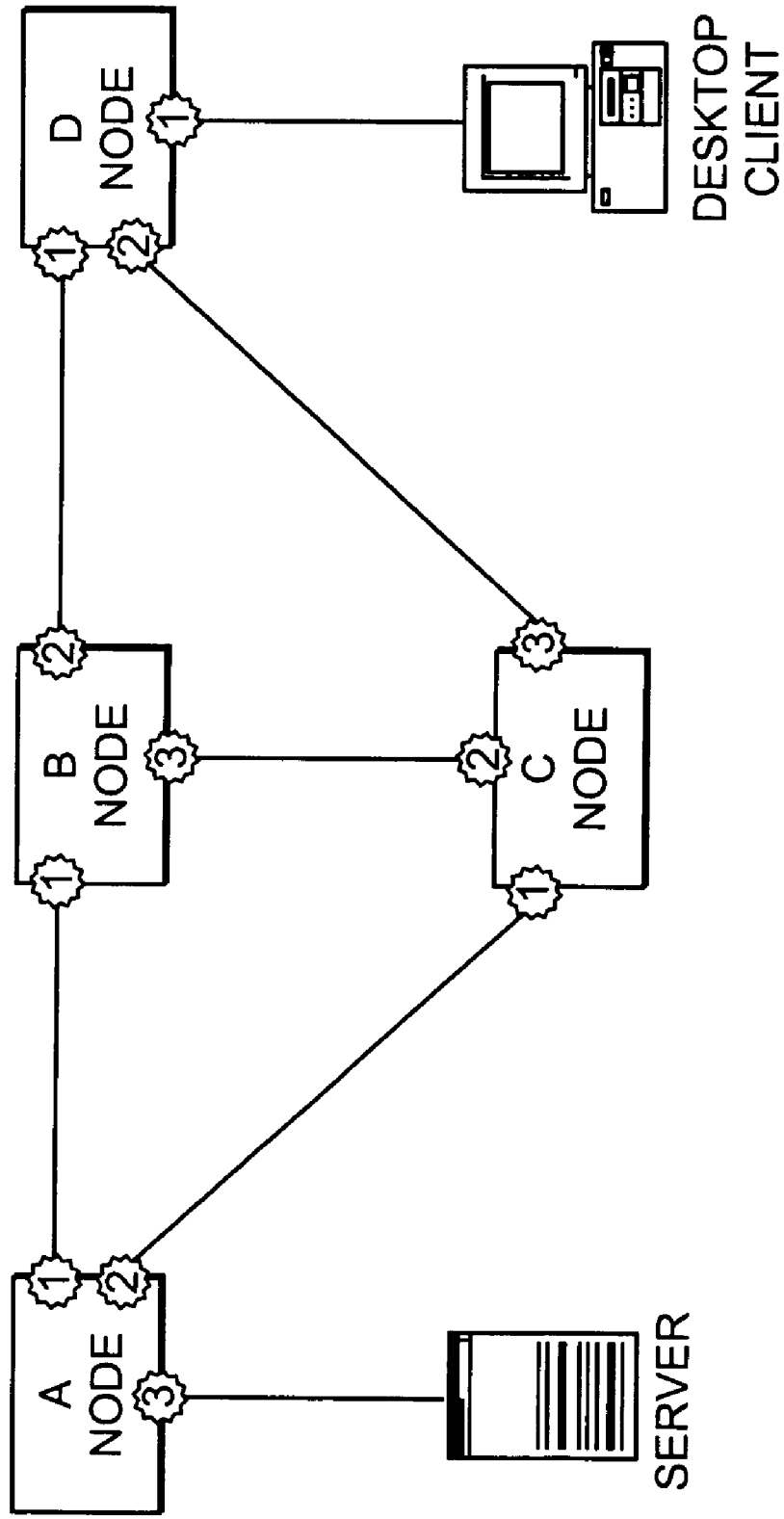

FIG. 8 shows a basic network of Scheduled Switches each with three links that will be used to send and receive data packets as they progress through the network. This illustration will serve as an example for a step-by-step description of the packet-scheduling software.

FIG. 9 shows an exemplary switch connection matrix according to an illustrative embodiment of the present invention.

Figure 10:
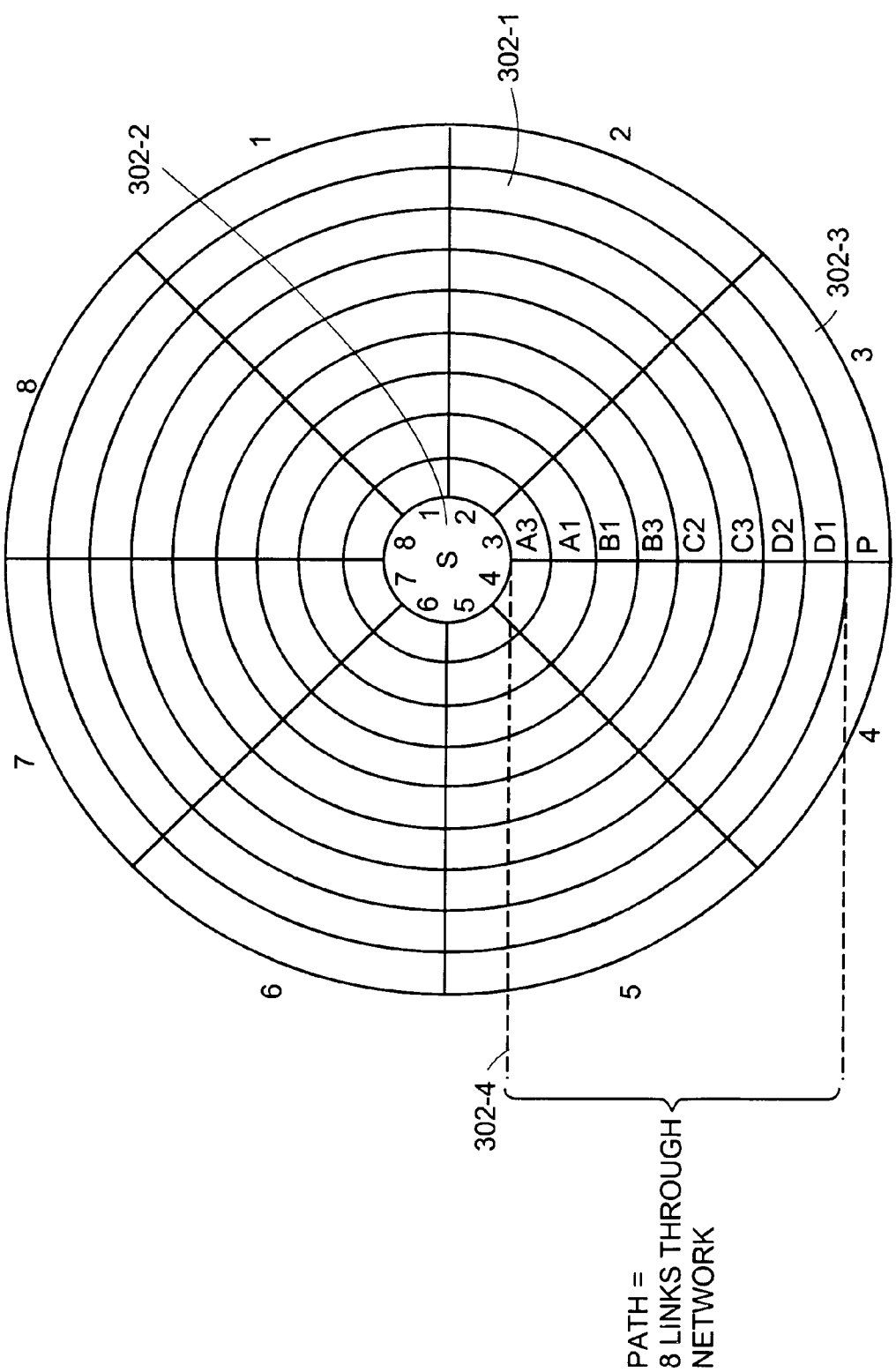

FIG. 10 shows an exemplary circularly linked data structure representing a tumbler algorithm according to an illustrative embodiment of the present invention.

FIGS. 11A-E illustrate the use of an exemplary circularly linked data structure as a tumbler mechanism to schedule appointments in a particular path through a network according to an illustrative embodiment of the present invention.

Figure 12:
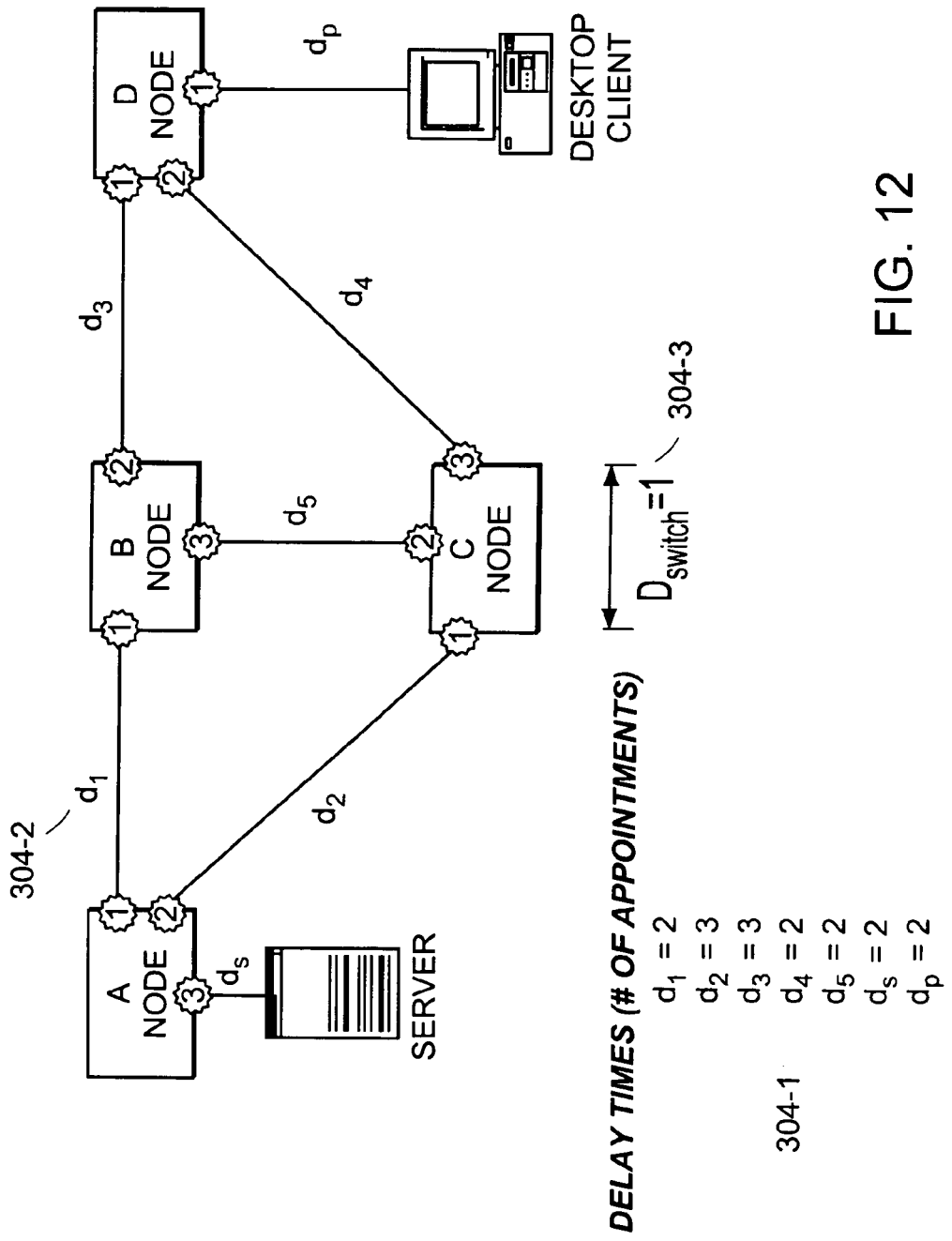

FIG. 12 shows an exemplary configuration of switches with indicated transmission delays and latency delays through the switches according to an illustrative embodiment of the invention.

Figure 13:
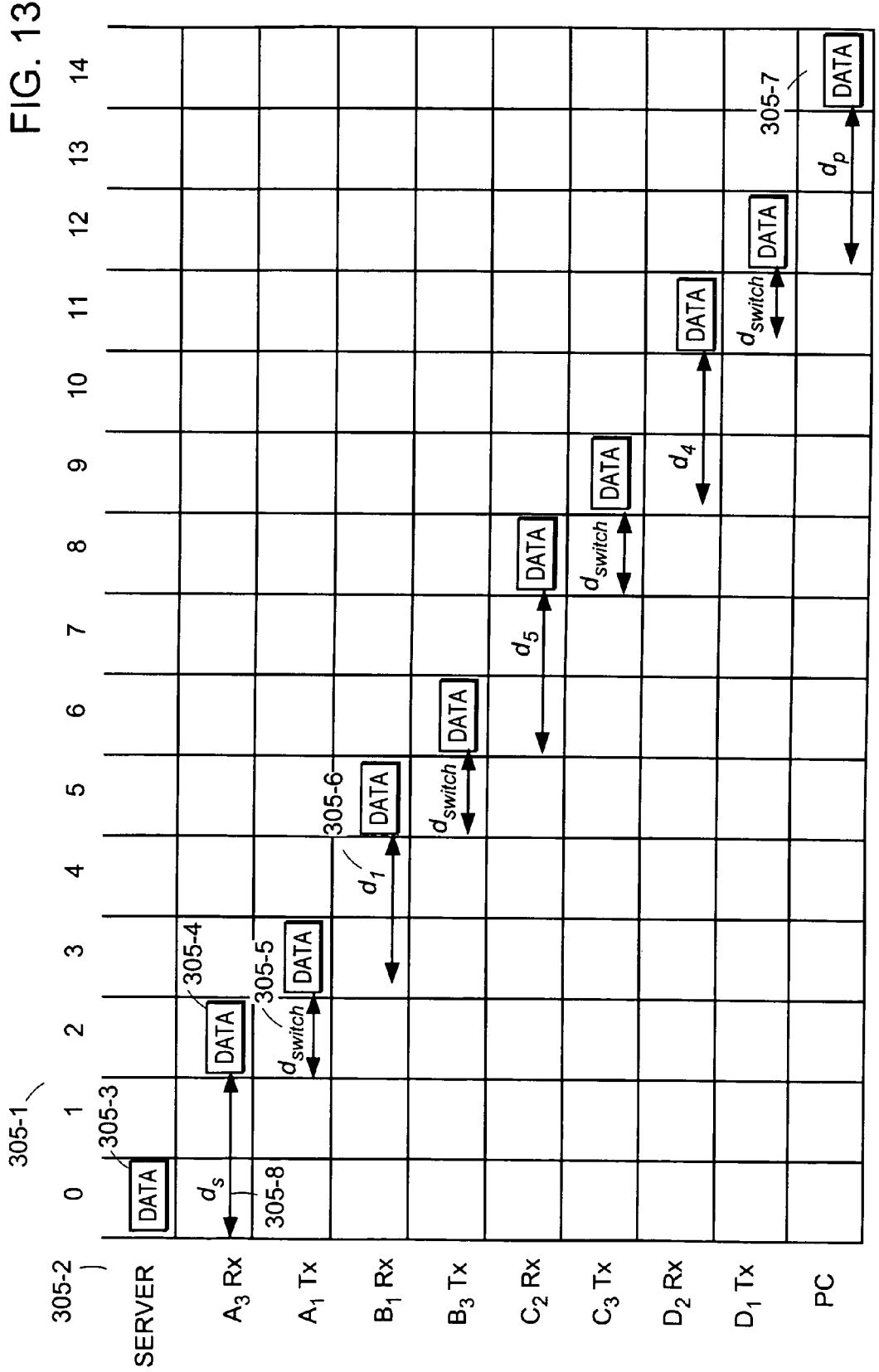

FIG. 13 shows an example of the movement of a data packet indicating transmission delays and switch delays referenced to clock times represented by the columns as the data packet traverses through a particular path through a network according to an illustrative embodiment of the invention.

Figure 14:
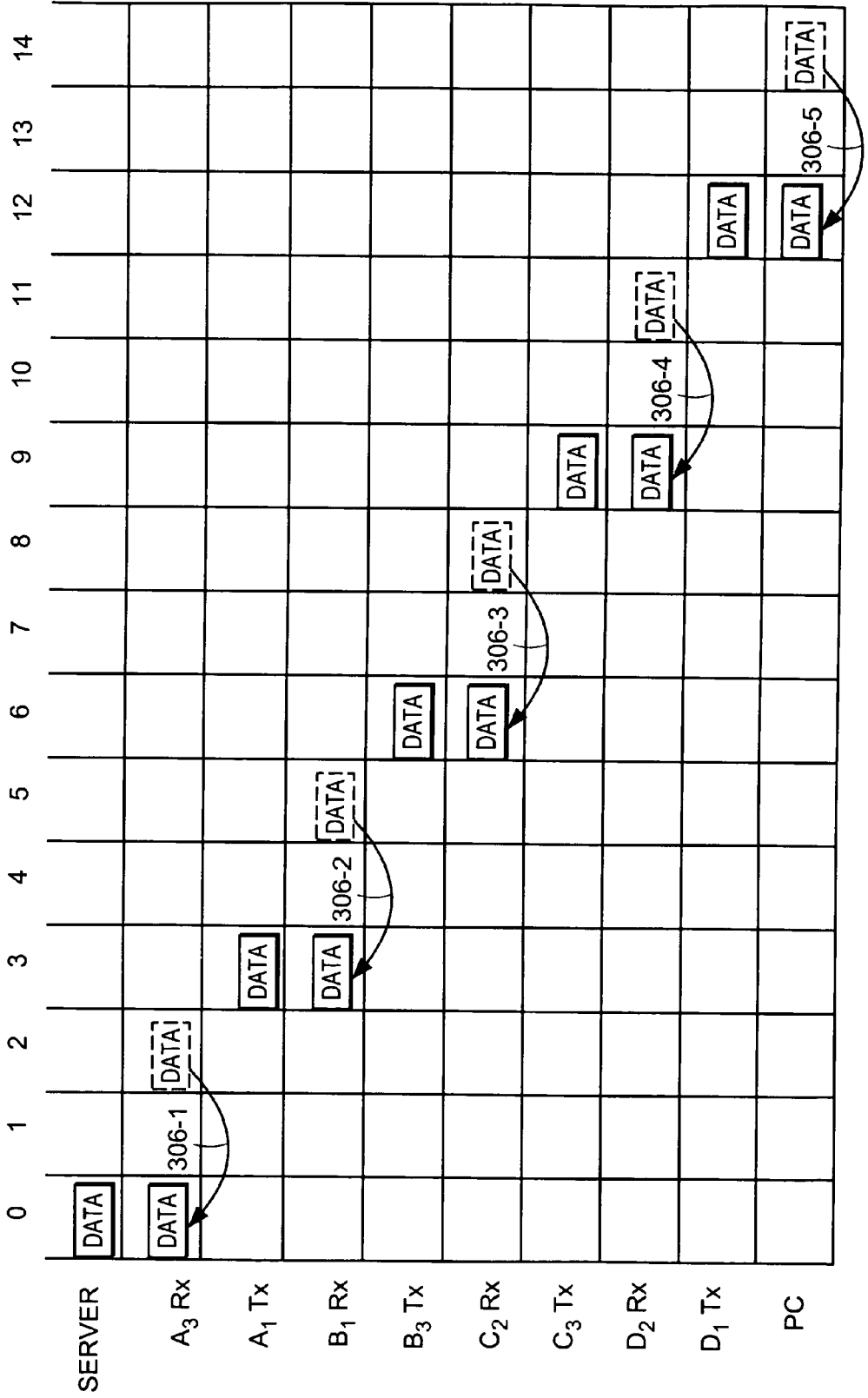

FIG. 14 shows an example of the movement of a data packet through a network to illustrate the effect of the skew compensation according to an illustrative embodiment of the present invention.

Figure 15:
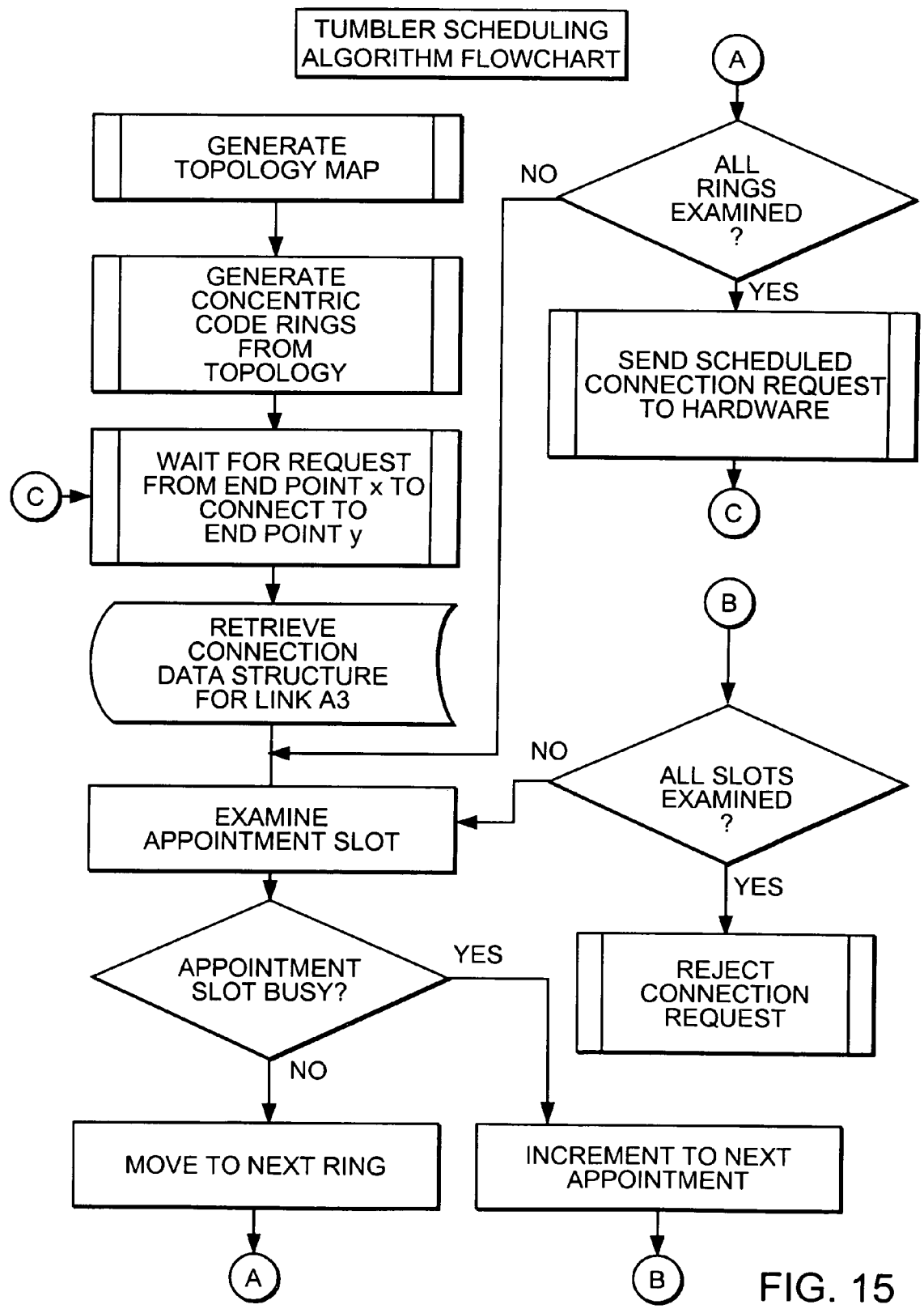

FIG. 15 shows a flowchart for a Tumbler Scheduler Algorithm according to an illustrative embodiment of the invention.

Figure 16:
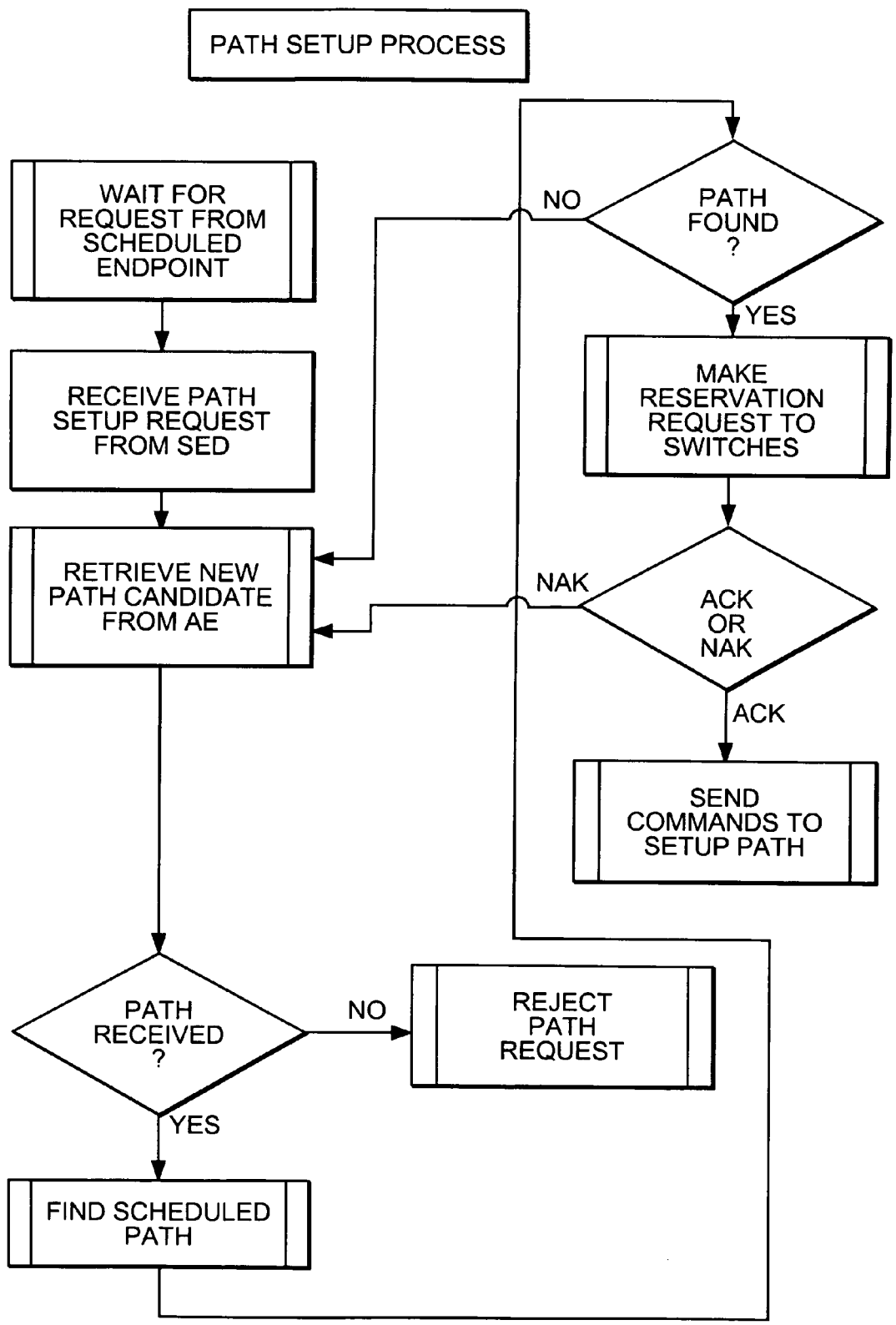

FIG. 16 shows a flowchart for a path setup process according to an illustrative embodiment of the present invention.

BRIEF DESCRIPTION OF THE PACKET SCHEDULING ARCHITECTURE

Figure 1A:
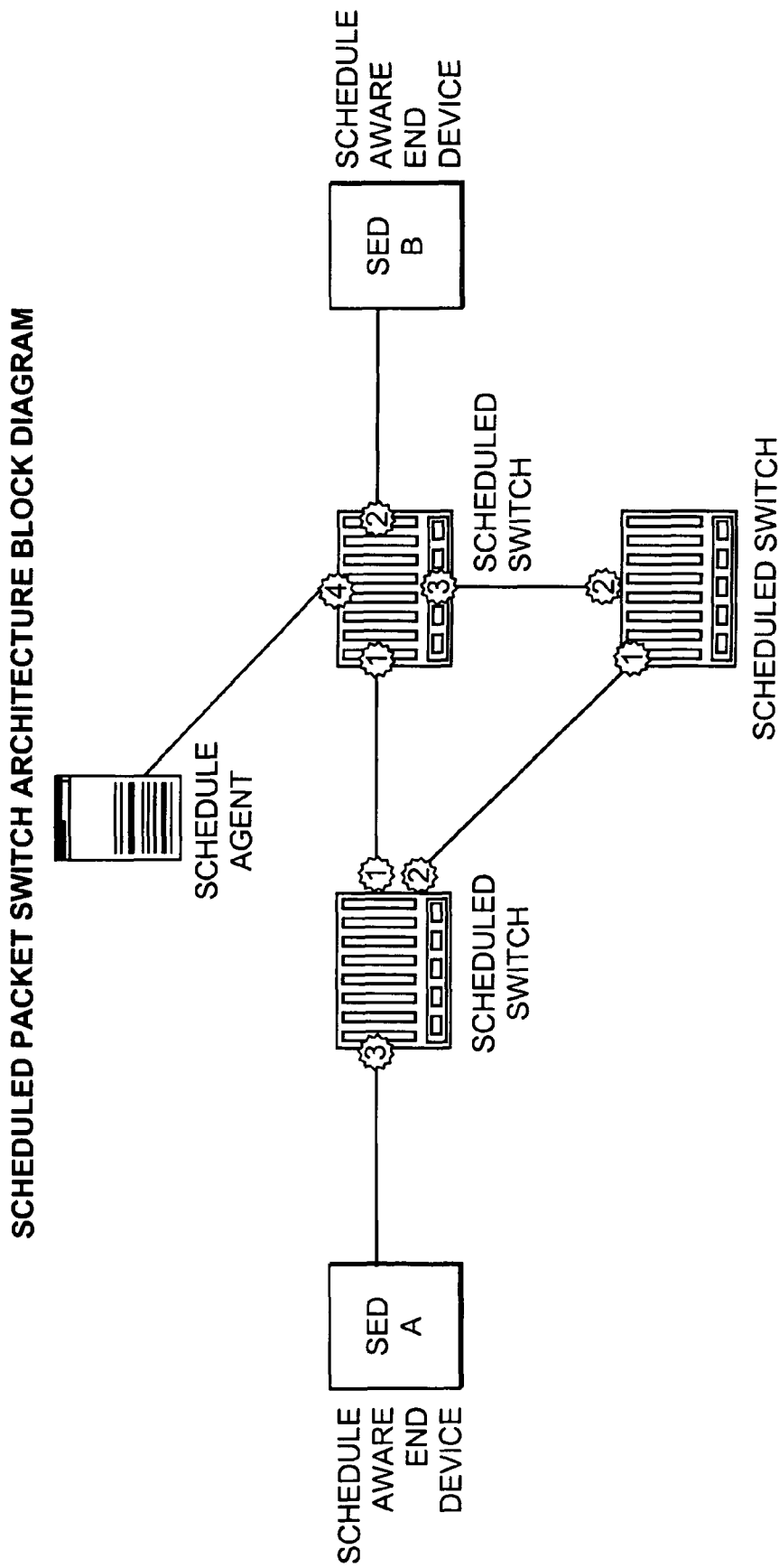
FIGS. 1A and 1B show a high-level block diagram of the disclosed Scheduled Packet System. There are three subsystems required for a Scheduled IP Data Packet Switching System and are shown as follow.
Figure 1B:
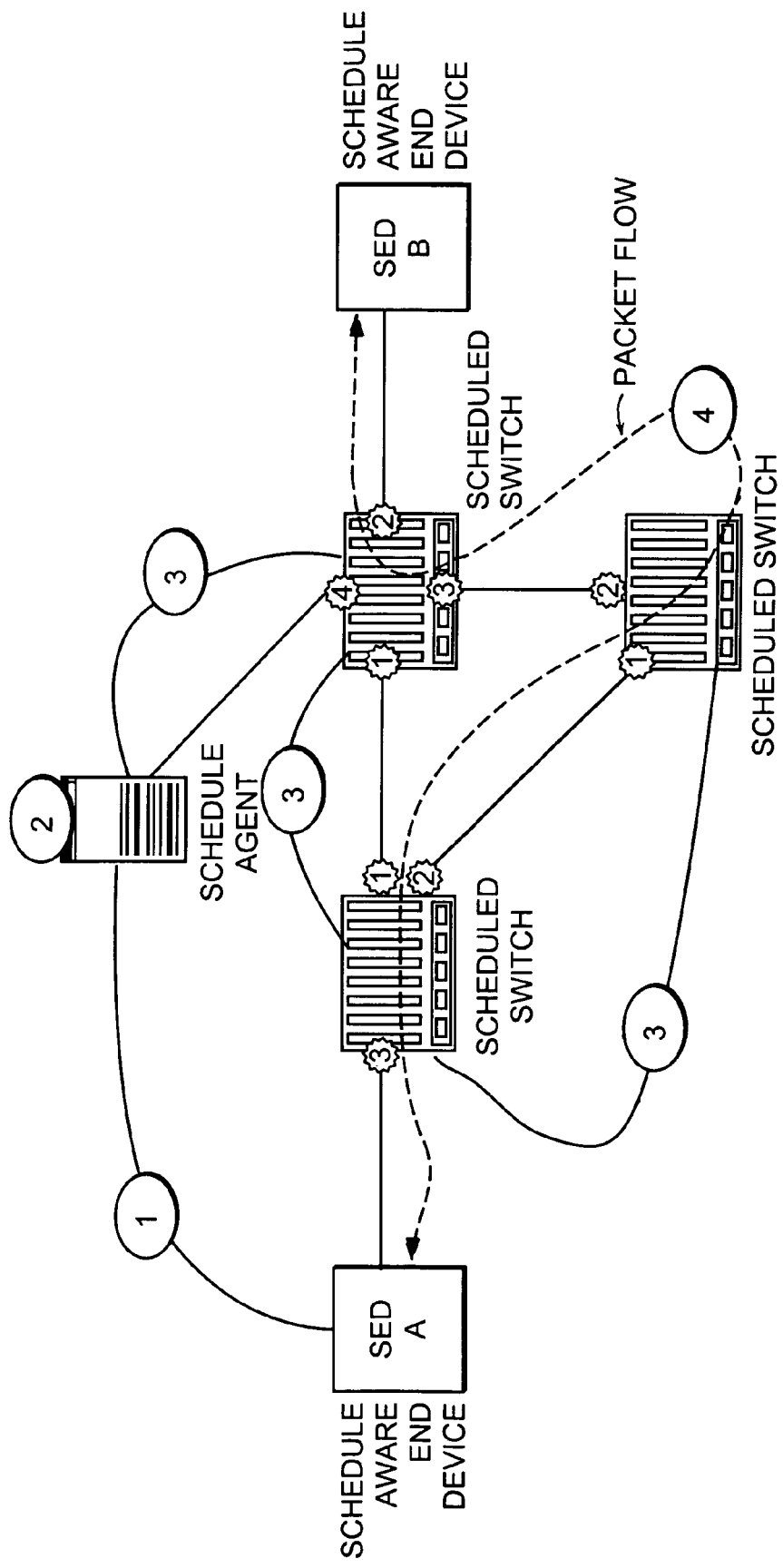

FIGS. 1A and 1B show the basic architecture of the currently disclosed invention. As shown, the disclosed Scheduled Packet Switching architecture differs from traditional IP routing and switching systems in that the entire network is pre-configured, controlled and monitored by a centralized function called a Schedule Agent (SA). The primary functions of the SA are manifested in the form of a software program that is hosted by an industry standard computer. Although the functions of the SA are centralized relative to the network, the SA function can be implemented in a standalone fashion (as shown), or geographically distributed over long distances. Additionally, because the SA is a software application, it can be hosted by servers that are configured as clusters for more performance and high availability, or by hardened fault tolerant computers for the most demanding mission critical applications.

There is no explicit requirement for the SA to be a dedicated computer. The SA software can also operate as one of a number of applications running within a multi-tasking or multi-user server. There is no requirement that the SA computer be limited to one computer. Any number of SAs can be added to the architecture to provide more capacity and higher availability via redundancy. The SA function is capable of working as one of a distributed set of SAs that may be geographically separated into multiple switch domains.

Having complete knowledge of the state of the ports in each of the switches, the SA selects, reserves and schedules the best possible connection from one end point to another. For one-way or half-duplex communications a single path must be set up. For full-duplex operation, two paths must be set up for the transmission and receiving functions for the endpoints. This full-duplex connection allows the endpoints to transmit to each other at the same time, providing for normal overlapped conversation when used in a voice application. In the case of multicasting IP packets, the SA may be required to assign and schedule many paths through the network.

Although the SA has ultimate control of the scheduled state of its underlying network, the Scheduled Switch hardware will always attempt to route unscheduled IP traffic independent of the SA, using open (unscheduled) appointments. However the SA has priority when it sets up a schedule path, doing so at the expense of available bandwidth for unscheduled traffic. When a scheduled packet is traversing each link during its scheduled appointment times, unscheduled traffic is held in a queue to be forwarded only when an open schedule is available.

There are four basic operations that must occur to utilize the full feature set of the disclosed invention. The steps are illustrated in FIG. 2. Assuming that the SED (A) wants to set up a real-time IP session with SED (B), the following steps must occur:

1. SED(A), as part of the feature set of a Schedule-Aware Endpoint, establishes a real-time session with SED(B) by requesting from the Schedule Agent, a scheduled path through the network.
2. When the SA receives this request, it will examine the state of the underlying network by referencing its own database. If there is no circuit available that meets the requirement of the real-time session, the set up request from SED(A) is rejected. If the SA can schedule a circuit, then,
3. The SA sends a string of command packets using the Cetacean Scheduling Protocol, to each of the Scheduled Switches to reserve a scheduled appointment at each of the required links. In this example, the SA determined that a scheduled path between SED(A) and SED(B) can be accommodated via links (X3), (X1), Z1), (Z@), (Y3), and (Y2).
4. Once the Scheduled Switches have reserved the appropriate appointments at each of the above links, SED(A) and SED(B) will be able to communicate with each other without the bandwidth being reduced due to other scheduled or unscheduled traffic. The illustrated data path is precisely controlled by the hardware such that other traffic is never flowing through the affected links during the session's assigned appointment schedule.

FIG. 2 and FIG. 3 show basic Scheduled Packet Switching configurations. The functional description of each block is as follows:

The Schedule Agent as shown is a standalone general-purpose computer as described above.

The Scheduled Switch which is described in detail in a separate disclosure (see U.S. patent application Ser. No. 09/746,744, which is herein incorporated by reference in its entirety). In this illustration each switch has a plurality of links that are connection paths to other switches or endpoints.

The Scheduled Internet Protocol Telephone that is described in detail in U.S. patent application Ser. No. 09/780,685, which is herein incorporated by reference in its entirety, is a telephone with the added circuitry to transmit and receive voice data packets on a precise schedule as set up by the Schedule Agent.

The POTS to Ethernet Converter serves as an interface-converter for allowing legacy analog telephones (POTS equipment) to participate in a scheduled network. This conversion is necessary to retime their arbitrary (non-scheduled) transmissions and receptions of data packets so they can be transferred to and from the switches on a scheduled basis.

The Softswitch is a commercially available system that is used to provide call control functions and revenue producing functions such as billing and provisioning of services.

The Gateway is a commercially available system intended to interface POTS (legacy telephone equipment), T1 lines, DS-3 lines, etc., into an IP network.

Overview of the Packet Scheduling Process Using Scheduled Switches

Referring to FIG. 4, in this data flow example a Server (S) will request that a scheduled real-time session be set up with a PC-based data collection system (P).

1. The end node (S) requests that a scheduled path be setup between itself and the PC (P), by contacting the Scheduling Agent (SA).
2. The SA calculates the best route (path through the network) for the requested session.
3. The SA then attempts to reserve all of the appointments needed at each link to fulfill the request. The SA sends Cetacean Networks Schedule Protocol (CSP) appointment reservation packets to each link along the path. Note that the CSP packets are unscheduled traffic packets flowing across the network. Therefore, CSP packets are mixed in with all other packets arriving on a medium at the Switch.
4. CSP traffic is redirected to the Switch Control Module (SCM) by the Fabric processor. The SCM analyzes the CSP packet to determine the type of command and the line card that will be used to process that command.
5. The SCM transmits the packet to the Line Control Module (LCM) across the mid plane Ethernet connection that is used to connect the SCM and LCM cards.
6. The LCM processes the CSP packet and passes the required pieces of data to the Digital Communications Processor.
7. The Network processor uses this data to establish an appointment in its itinerary list. If this appointment can be accommodated, the network responds to the LCM with an Acknowledgement (ACK). If this appointment cannot be accommodated for some reason, a Not-Acknowledged (NAK) message is sent back to the LCM.
8. The LCM creates a response CSP packet that is sent back to the SCM.
9. The SCM forwards this response back to the Fabric processor.
10. The Fabric Processor then switches the packet to the Digital Communications Processor that is connected to the SA. Assuming that the SA has received an ACK from the switch connected to the SA, the Server will now be in a position to send its data packets through the switch via a reserved packet itinerary that will then be guaranteed to run at full bandwidth as it will be unencumbered by either unscheduled traffic or scheduled traffic that is operating on a different schedule.
11. The Server (S) sends its data packets to the Switch's Network Processor. The Network Processor can receive both scheduled and unscheduled traffic. Scheduled traffic as from (S), is queued in the scheduled traffic queue, and transmitted at the time specified. Unscheduled traffic and CSP traffic is queued in the unscheduled traffic queue. When free appointments are available, any unscheduled traffic in the queue can be transmitted.
12. Data from the DCP is transmitted to the Personal Computer (P).

Brief Description of Predictive Network Scheduling

As previously documented, the current disclosure describes an invention that pre-schedules a synchronized flow of data packets through any number of links within any number of data packet switches such that bandwidth is guaranteed and network transport delay is deterministic. The extensibility of the current invention is limited only by the capacity and performance of the SA computer(s). Thus, when a transmitting endpoint requests a circuit to a designated receiving endpoint, the SA as described herein will command the switches to establish a distinguished path through the topology of the network.

A path is distinguished in three dimensions; by (1) "Best Available" for the current requested session, (2) by scheduled arrival times at each of the links for designated data packets, and (3) by association of a particular time schedule with a particular packet flow.

When a network path is requested, the software components of the currently disclosed invention will examine the current state of the available circuits between the requesting network endpoints to determine the "best" available circuit paths that can be established between the two end points. In this context, "best circuit" can be defined by any number of metrics necessary to make such a decision. For example, the SA may consider factors such as geographic distance between switches, current load, link speed, shortest or longest circuit delay, time of day, day of week, cultural holidays, or any other data that may be important to effectively reserve a scheduled packet flow.

A unique aspect of the current invention is that data paths and schedules within those paths may be chosen and constructed to more efficiently respond to future heavy load periods. For example, if the SA has current or historical data that indicates that a switch located in a particular geographic location becomes a bottleneck at particular times of the day, the Schedule Agent can choose to minimize immediate use of the switch by routing packets through other switches in anticipation of an upcoming busy period. Thus, the SA can choose to sub-optimize the current path selection in order to minimize any blocking effects that could be caused by non-predictive scheduling.

Detailed Description of the Packet Scheduling Architecture

FIG. 5 illustrates a simple network. The switch nodes in the network are labeled A, B, C, D, E, and F. For a scheduled network, a Digital Communications Processor communications processor within each of the switches maintains a constantly recurring 20 millisecond schedule of appointments for each of the links within the switches. Each of the appointments is a placeholder for a data packet. Note that each of the switches is synchronized to a common clocking mechanism by way of a recurring heartbeat signal (200-1). Thus, all of the links within the switches are cycling, in lock-step, through their appointment schedules, they are all working on the same appointment number. For example, if within the global system-wide 20 millisecond period the links the recurring appointment schedule is currently on appointment #98, then all links within the system are working on appointment #98.

Given this synchronized operation, the SA will cause the communications processors within the switches to earmark a particular appointment for a particular stream of future data packets. Conversely, the SA computer will also tear down a particular schedule of appointments when its session is ended. In normal operation, the various links may be of different speeds, more loaded than others, or simply down due to hardware failure. Given these criteria, it is the responsibility of the SA to find and assign virtual circuits, or data paths, through the switch such that the two or more requesting end points are accommodated with a complete itinerary of scheduled appointments. Given that the Schedule Agent has total knowledge of the state (reserved or open) of each of the appointment assignments for each of the links within the network, the SA can analyze the network to look for a series of appointments that can be reserved such that a packet can traverse the network from endpoint to endpoint in a totally scheduled and therefore deterministic manner.

It is immediately obvious that the number of appointments allocated to each link's schedule interval is directly related to the effective data rate of the associated link. Table 201 lists the number of appointments available for different media types.

FIG. 6 and FIG. 7 illustrate the detailed structure of an appointment schedule.

TABLE 201

| Link Type | Full Data Rate (Megabit) | Usable Data Rate (Megabit) | Number Appointments |
|---|---|---|---|
| T-1/DS 1 | 1.544 | 1.536 | 15 |
| E-1 | 2.048 | 1.920 | 19 |
| T-3/DS-3 | 44.736 | 43.0 | 430 |
| 10Base-T | 10.0 | 10 | 100 |
| 100Base-T | 100.0 | 100 | 1,000 |
| 1000Base-F | 1000.0 | 1000 | 10,000 |
| Sonet/OC-1 | 51.840 | 43.0 | 430 |
| OC-3 | 155.52 | 129.0 | 1,290 |
| OC-12 | 622.08 | 516.1 | 5,160 |
| OC-24 | 1,244.2 | 1032.2 | 10,322 |
| OC-48 | 2,488.3 | 2,064.4 | 20,644 |
| OC-96 | 4,976.6 | 4,128.8 | 21,288 |
| OC-192 | 9,953.3 | 8,257.6 | 82,576 |
| OC-256 | 13,271.0 | 11,010.0 | 110,100 |

All of this information is pulled together and shown in FIG. 7, which shows the relationship between time, schedules and appointments.

The top part of the figure shows two consecutive 20-millisecond schedules. Inside each schedule are shown N appointments, numbered 0 to N−1. If a particular flow is given an appointment slot on any link, it has that appointment for all schedules until that flow is terminated. The number of appointments in a schedule from 0 to n−1 are equivalent to their respective link entries in Table 201.

FIG. 7 shows an expanded view of an individual appointment. The appointment is shown as a stream of 250 bytes of data (2000 bits) with the leftmost bit (203-1) being the first on the network. The hash marks give markings in 80 bit (10 byte) increments (203-2). This appointment is shown with 160 bytes (1280 bits) of application data (203-3). For flexibility, an appointment is designed such that it can have as little as 46 bytes (368 bits) of data. Note that 172 bytes of data would exactly match the maximum size of 250 bytes (payload plus the headers, jitter and detection overhead bits); however there must be some space (2 bits) reserved for jitter and some space (2 bits) for the detection band. The current disclosure reserves 10 bits, which is rounded to 2 bytes (16 bits). This sets the maximum limit on a single appointment size to 170-bytes of application data. If a data packet exceeds the 250-byte limit (application data and overhead), it will spill over into another appointment.

The maximum IP limit is 1500 bytes for an IP packet. This allows 1460 bytes for real time traffic (taking out the 40 bytes reserved for IP, UDP, and RTP headers). A fall size packet would span 1548 bytes, or 7 appointments. Therefore, a real time stream that used maximum IP packets and had only a single itinerary could stream 73,000 bytes per second.

To facilitate architectural extensibility and accommodate current market trends toward large packet sizes, the design supports packets that exceed the 1500 byte limit. There is market evidence that some applications require 9000 byte packets. The 9000 byte packets would require 37 contiguous appointments and could stream 448,000 bytes per second. Doing a multi-part stream, with groups of 5 appointments per stream, each appointment would allow 1170 bytes of application data. A 10 Base-T network would (with 100 appointments) stream 1.17 megabytes per second. This is adequate to support 1 or 2 compressed video channels, 2 phone channels, and about 150 K bits/sec data channel.

Note that at the far left side of the appointment block is a line labeled Detection Band (203-5). This band is very narrow (roughly 10 bit times for 10 Base-T, 20-40 bit times for faster connections). If the scheduled appointment data does not arrive during that detection band, then the scheduled traffic is declared dropped for that particular appointment/schedule time. Thus, there will be no traffic forwarded to the follow on appointment. Therefore, the missed appointment, for this schedule period only, is available for unscheduled traffic.

To transmit unscheduled traffic over a scheduled appointment, the switch waits until the Detection Band has expired. It can then transmit the unscheduled traffic over that link. The link down stream that receives this packet will know it is unscheduled traffic since it started to arrive after the detection band period. Thus it is possible to send unscheduled traffic over lightly used appointment times as well as over unused appointment times.

Description of the Packet Scheduling Software

There are three primary software modules that interoperate with each other and with the Scheduled Switch hardware to implement the current disclosed invention: The Path Generation Engine, the Admissions Engine, and the Tumbler Scheduling Engine.

The Path Generation Engine (PGE) is responsible for generating the matrix of possible connection paths for the entire network topology. It may do this generation via a manually generated database or by discovery of the network topology via communications with the Scheduled Switch Hardware. Additionally, if the topology changes for some reason (i.e., reconfiguration by the user, hardware failure or network management), the PGE will update its database so that the Admissions Engine (AE) and the Tumbler Scheduling Engine (TSE) remain synchronized with the current configuration of the network topology. FIG. 16 shows the algorithm flowchart.

The AE is responsible for filtering the candidate paths from the PGE. Various criteria such as link speed can be used to make a determination as to which candidates to pass to the TSE. The TSE is responsible for assigning a specific schedule through the network.

Detailed Description of the Tumbler Scheduling Algorithm

Referring to FIG. 8, the simple network matrix represents a scheduled switch network. To setup a circuit, with a requested time path from node C to node E, the following algorithm is disclosed:

For the example network FIG. 8 (Switches A, B, C, D, E, and F), the possible connections for the network are shown in Table 301. As can be seen by comparing the Example Topology with the Matrix, Node A has three possible links (A1, A2, A3). For this example, A1 is assumed to be an ingress point for a Scheduled Endpoint network device while A2 and A3 are connected to D1 and F2 respectively. The full connection scheme is seen by examining the matrix in Table 301 where the "?" entry designates a connection between the two links.

Once an endpoint requests a connection to another endpoint(s), the PGE examines its connection data and passes the path mapping data to the Tumbler Scheduling Engine (TSE) via the Admissions Engine (AE). In practice the PGE may have many possible paths that can be used to connect one endpoint to another. In this case it will present such candidate paths based on a specific set of criteria if so desired as enforced by the AE. Any set of heuristic data can be used to prejudice the selection of path data.

Referring to FIG. 10, the mechanism used to control the Scheduled Switch hardware is best visualized as a set of concentric rings, with each ring representing the schedule of appointments for a particular link. During the Path Search process, the rings will be turned (via software) until a contiguous set of free appointments is found for the candidate path submitted by the AE. The operation is similar to that of a combination lock, hence the reference to a Tumbler. The spaces in the rings represent the schedule appointments. For example the space at ring segment D1-2 (302-1) represents the second appointment period for Link D1. Although there are only eight appointments represented in the example, there can be thousands in actual practice, depending on the link speed. Again refer to table 301 for the number of appointments required for each type of link.

Again referring to FIG. 8, if we assume for this example that the Server (S) desires to establish a one-way path to the PC (P), a Tumbler map is set up by the Software as illustrated by FIG. 10. Note the starting endpoint is assigned a schedule as indicated by the center ring (302-2) and the receiving endpoint is designated by P (302-3). Every link within the switch hardware is assigned its own schedule circle that will store the state of each appointment within the schedule period (302-4). Thus, FIG. 10 shows a scheduling tumbler mechanism with schedule circles for links Endpoint S, A3, A1, B1, B3, C2, C3, D2, D1, and Endpoint P. There are no appointments reserved in this example. Note that at each of the specific appointment times within the 20 millisecond schedule period, the link can be either transmitting or receiving the data packet assigned to that appointment time. Once a scheduled path is assigned to the end points, (called an itinerary) the Scheduled Switch hardware will enforce the data packet schedule for each of the links.

The number of "tumbler" rings necessary for a path is directly related to the number of links between the Scheduled Endpoint network devices (302-4 and Table 301 FIG. 9).

To those schooled in the art of synchronized state machines, it should be apparent that a scheduled network, synchronized to a common time reference, will now exhibit totally deterministic behavior. This is the case because from the first to last data packet transferred between the endpoints, their packets will occupy the exact time period (schedule) for each of the links throughout the path. Additionally, it can be seen that even when a link is receiving or forwarding packets from other endpoints, the packets that have reservations in different appointment slots remain unaffected.

The circular nature of the data structure of course shows that the schedule recurs in time every 20 milliseconds. If a link is occupied for a particular appointment increment, the increment is marked on the schedule ring.

Again referring to FIG. 10, the actual software implementation for the Tumbler algorithm uses circularly linked data structures within the SA computer. The circular tables represent a repeating schedule, which is chosen as 20 milliseconds for this particular implementation, although the time period can be changed for different types of network uses.

To determine if a time path can be found along a set of connected links, the schedule rings are placed around their neighbor going from source outward to destination. See FIG. 10. The start point of the path from S to P is the schedule ring for S. This is surrounded by its next hop in the path, A3, and so on with the final destination link between D1 and P, our destination.

Figure 11A:
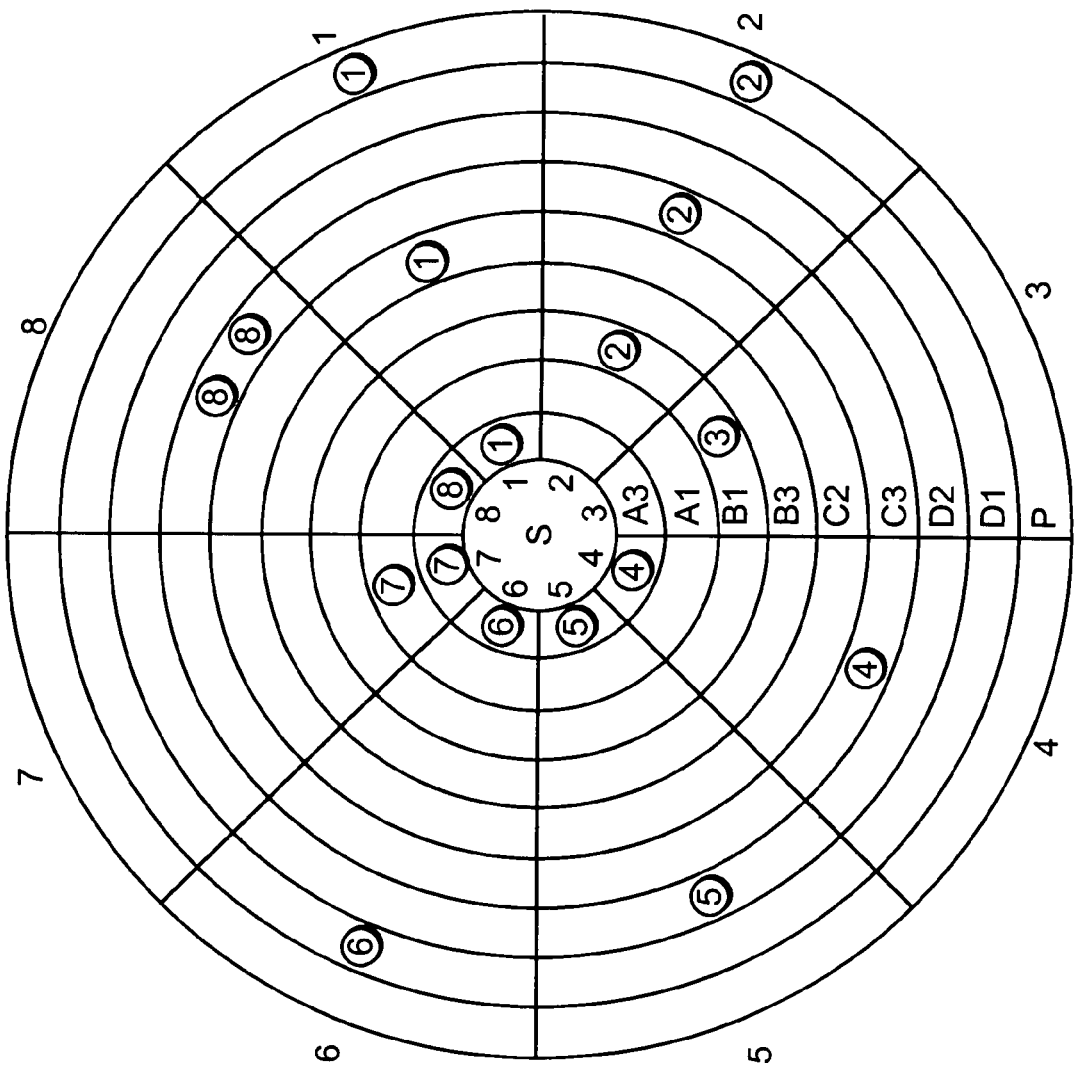
Figure 11B:
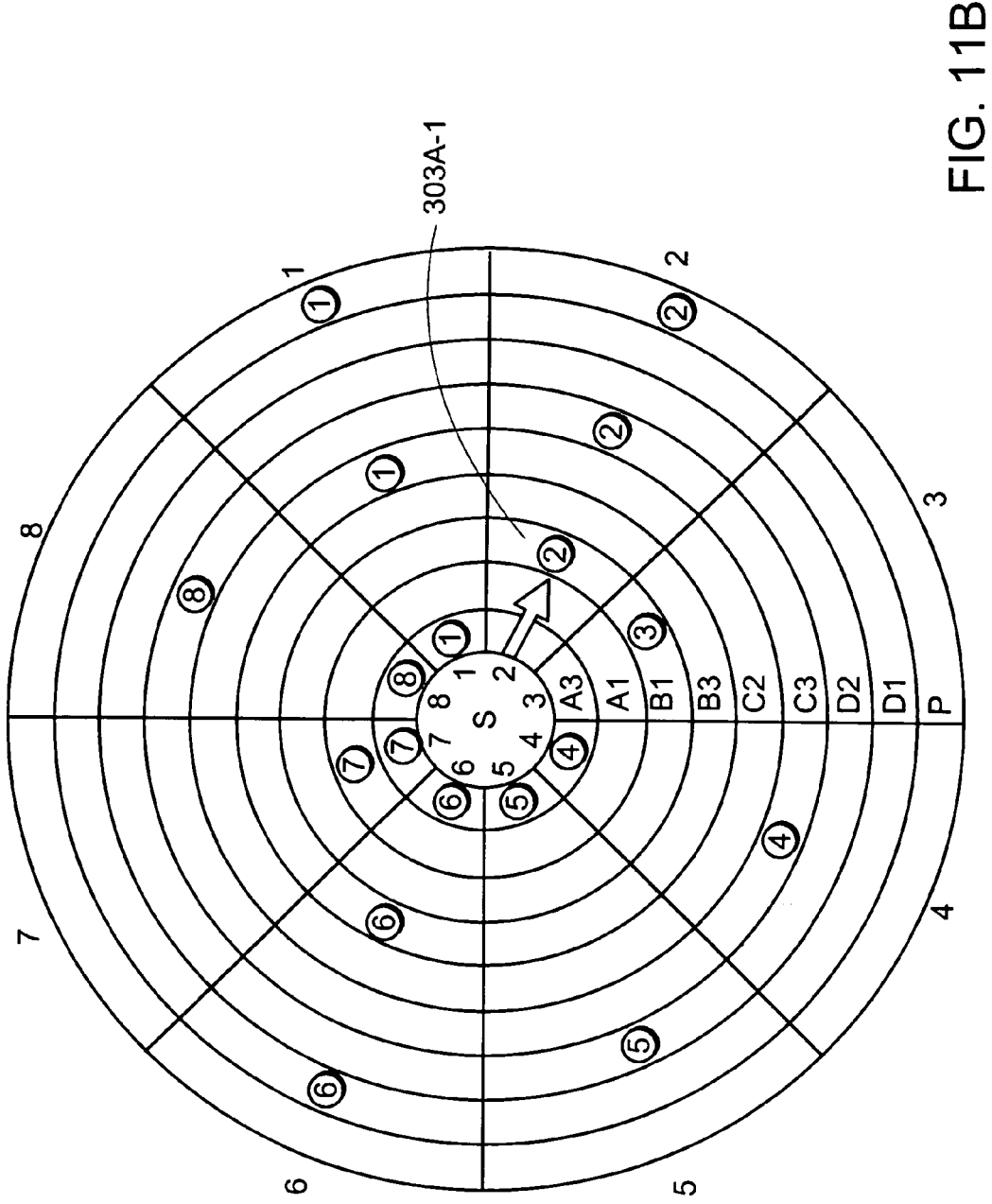
Figure 11C:
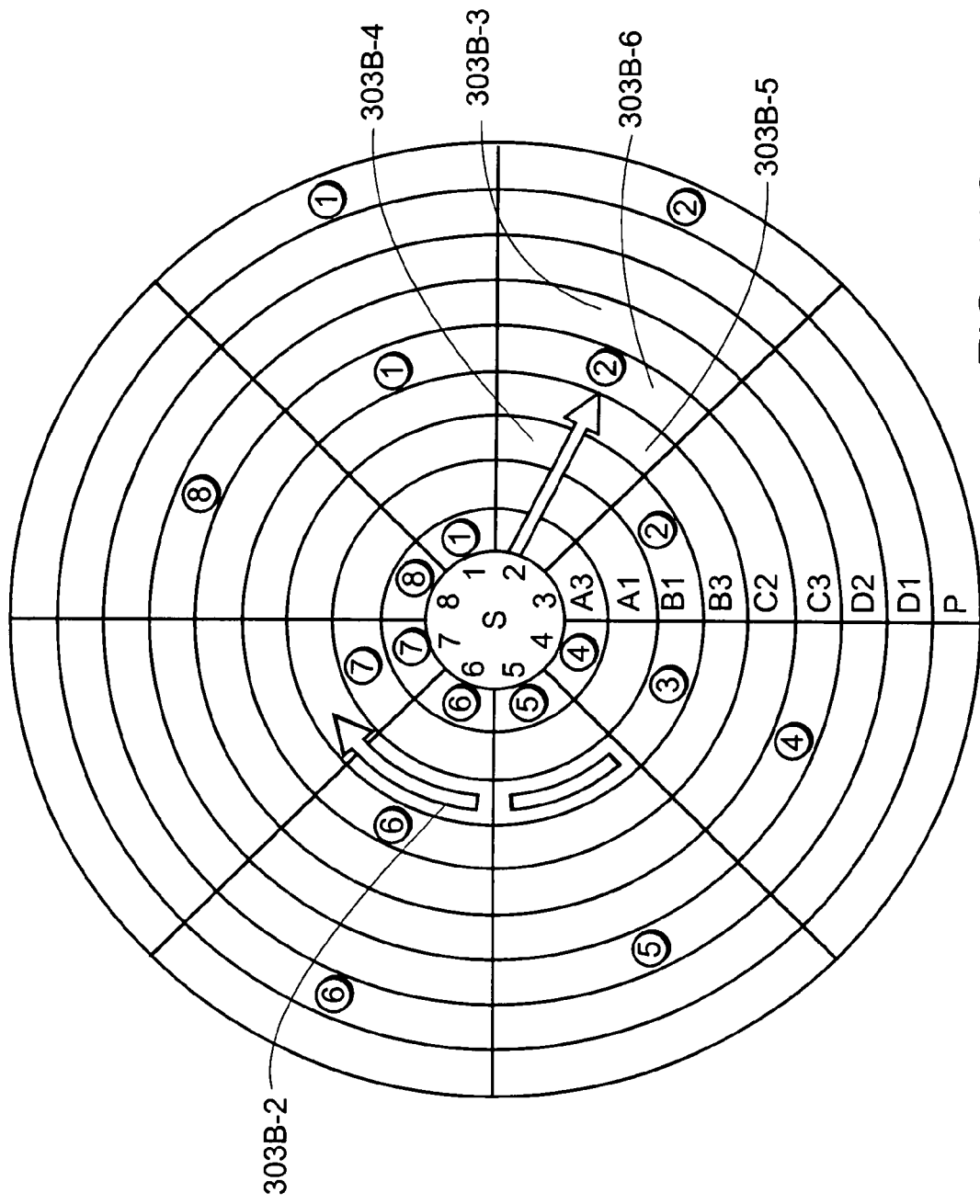
Figure 11D:
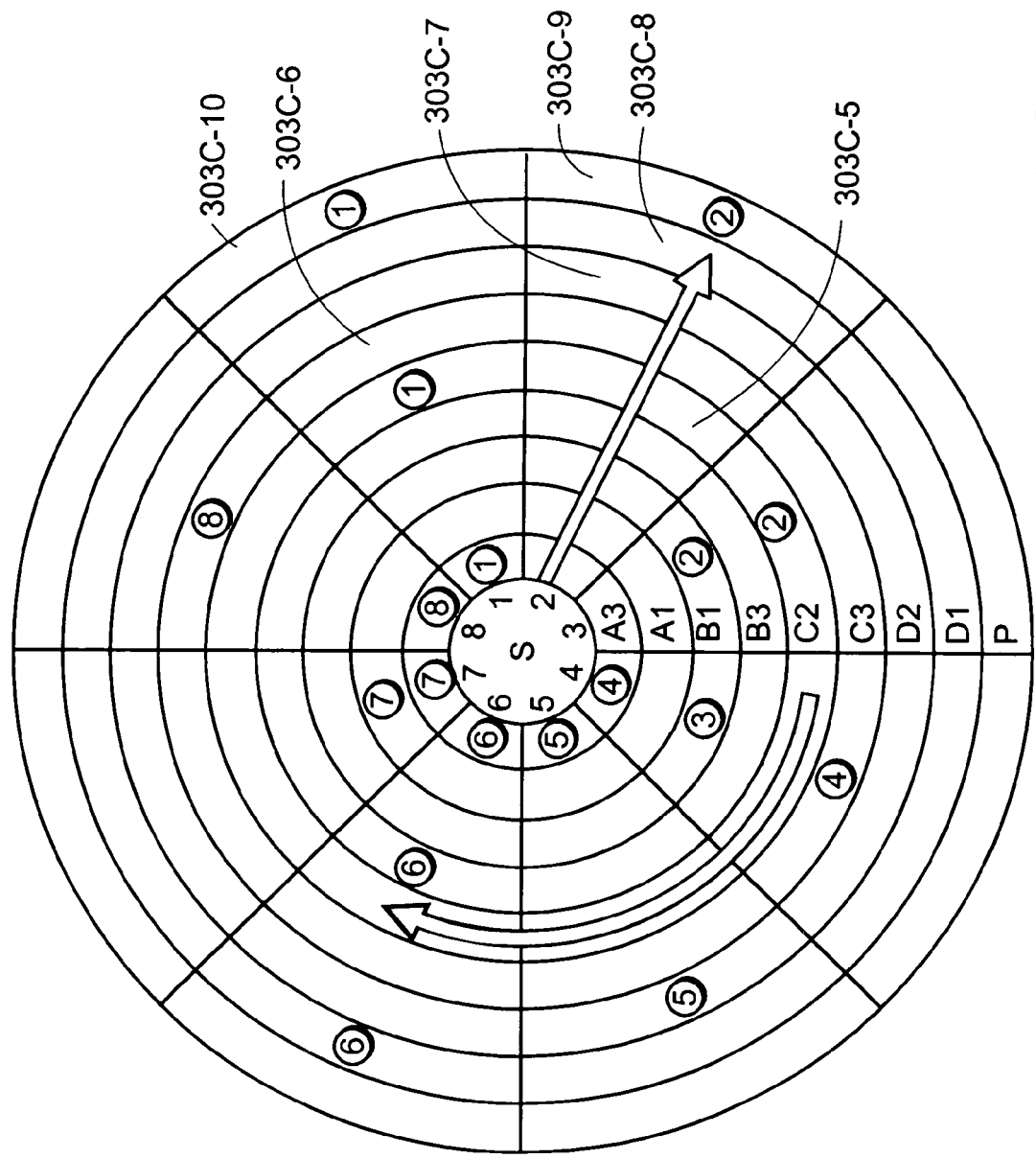
Figure 11E:
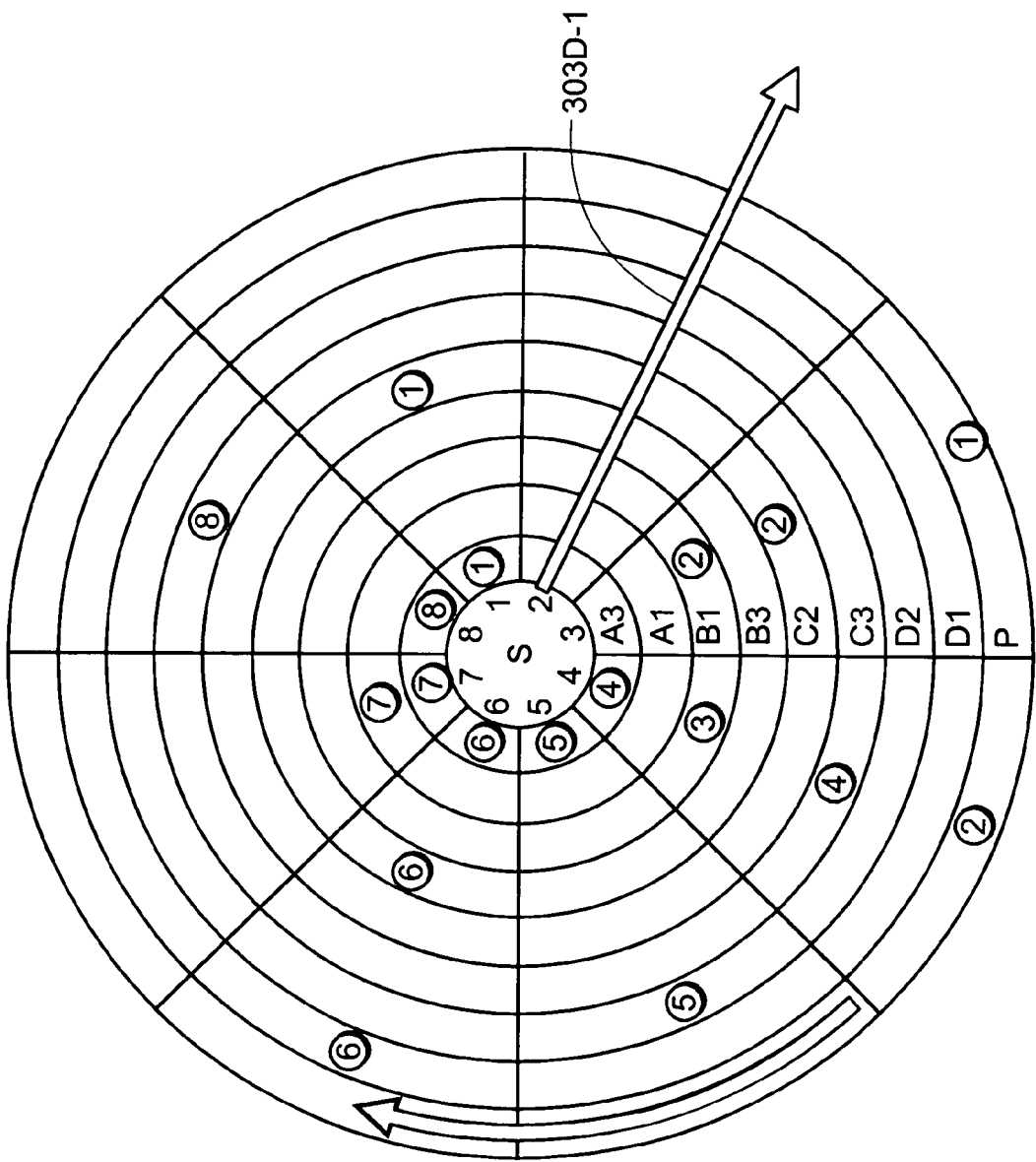

Assume that S has requested a scheduled path to P. The PGE proposes the path as indicated by the circular ring set indicated in FIGS. 11A-E. Note that in this case, there are appointments already reserved within each of the individual link schedules. Observe that in its initial state there is no clear path from the inner circle (S) to the outer circle (P). Thus, the map shows what all the links are doing at each schedule increment, but does not show how to find a path through the scheduled increments. To find the scheduled path, the following algorithm is disclosed:

1. Noting that in the current map, the S schedule is totally free and the next link is A3 with two open appointments,
2. Starting at A3-2 we note an open appointment. Jumping to the next ring we note that A1-2 is also an open appointment. We now have appointments in 2 of the 8 links needed to complete the requested scheduled path. Note the path designation arrow can move two links (A3 and A1) but is blocked by B1-2 (FIG. 11B, 303A-1).
3. Because B1-2 (303A-1) is reserved by another packet itinerary, the software will now rotate the circular table to the next earlier appointment (B1-1) on FIGS. 11A-11E. It is noted that this appointment (B1-1) is free (FIG. 11C, 303B-4). At this point we have 3 of the 8 links needed to complete the requested scheduled path.
4. The algorithm can now advance its path indicator to the next link B3-2 (303B-5) which is found to have an open appointment. At this point we have 4 of the 8 links needed to complete the requested scheduled path. The algorithm can now advance its path indicator to the next link C2-2 (303B-6)
5. We note that C2-2 is reserved so the algorithm will rotate the schedule to the next earlier appointment C2-1 (FIG. 11D, 303C-5). We note that C2-1 is free. The path indicator can be advanced to C3-2 (303C-6). At this point we have 5 of the 8 links needed to complete the requested scheduled path.
6. We note that C3-2 (303C-6) is a free appointment. The path indicator can be advanced to D2-2 (303C-7). At this point we have 6 of the 8 links needed to complete the requested scheduled path.
7. We note that D2-2 (303C-7) is a free appointment. The path indicator can be advanced to D2-2 (303C-7). At this point we have 7 of the 8 links. The path indicator can be advanced to D1-1 (303C-8).
8. We note that D1-1 (303C-8) is a free appointment. The path indicator can be advanced to P (303C-9). At this point we have 8 of the 8 links. The path indicator can be advanced to D1-1 (303C-8).
9. At this point we have all of the Scheduled Switch links earmarked for a final reservation but as can be seen at 303C-9, the number 2 reservation for this particular Scheduled Endpoint is reserved. This would most likely happen on a multi-tasking computer where a single network interface card is shared by two or more applications.

10. Since P2 is blocking the completion of the path, the schedule ring for P is rotated to the next previous appointment which is P1-1 (303C-10). We note that this appointment is also reserved. The algorithm again rotates to the next previous appointment P-8, which is found to be free.

11. Referring to FIGS. 11A-11E, we now have a complete path, indicated by the path indicator (FIG. 11E, 303D-1) going from the Starting point S through nodes A3-2, A1-2, B1-3, B3-2, C2-3, C3-2, D2-2, D1-2, and P-8.

12. At this point, the SA will send a reservation command to each of the switches to reserve the specific appointment times in each of the specific links.

Once a path has been scheduled, it is maintained by the Scheduled Switch until such time as an endpoint ends the session or an error condition is detected. When an end of session is requested, the SA will retrieve the itinerary from its database and issue a teardown command to the Scheduled Switches, which will then release the reserved appointments. FIG. 15 shows the flowchart for the Tumbler Scheduler Algorithm.

While the above disclosed software algorithm, in cooperation with the Scheduled Switch Hardware, will find and schedule a path through the network, there is no compensation for the delays that exist within each Scheduled Switch when going from link to link, or for the transmission delays when moving from switch to switch.

FIG. 12 shows the same configuration of switches used for the disclosure of the Tumbler Scheduler Algorithm with the added reality of transmission delays and latency delays through the switches. The actual delays are as indicated on the connectors between the switches and referenced to the table of delay times (304-1) associated with each transmission line plus the latency delay within the switch. For example delay $d_1$ (304-2) is the delay, in appointment times associated with the transmission line from A1 to B1. Referencing $d_1$ in the table (304-1) shows that the transmission delay from A1 to B1 is equivalent to 2 appointment times. Note also that the latency involved when a packet moves through a switch is indicated as $d_{switch}$ (304-3) (for example from C1 to C3) is assumed to be equivalent to 1 appointment time for these speed links.

FIG. 13 shows the placement of a single packet as it traverses through the grid of link appointments referenced against clock times represented by the columns numbered 0 through 14 (305-1). Referencing FIG. 12 for the respective link delay times, Server (305-2) starts transmission of its packet at the beginning of time 0 arriving at $A_3$ RX at time slot 2 (305-4). The packet then experiences latency delay ($d_{switch}$) while forwarded by $A_3$ RX to $A_1$ RX (305-5) within the switch. $A_1$ RX in turns forwards the packet to $B_1$ RX experiencing the delay $d_1$ (2 appointment times) before it starts to arrive at the beginning of time slot 5 (305-6). This process can be followed through to the destination PC (305-7) at time slot 13.

Remembering that the links are cycling through their appointment schedules in lock-step, where all are working the same appointment number, a problem can be seen at the first delay point, $d_s$, (305-8) where, during the delay period of 2 appointment times, the appointment cycle has moved two appointment times past where the SA's Tumbler Scheduling Algorithm believes it should be. This problem occurs at every point of delay.

To deal with this problem, the Scheduled Switches, aware of the equivalent appointment delay, will "skew" the receive appointment windows by the appropriate amount to accommodate the delay. Thus, without the skew compensation, the packet would miss its assigned appointment and be declared "unscheduled" by the Scheduled Switch.

FIG. 14 shows the effect of the skew compensation at (306-1), (306-2), (306-3), and (306-4).

Although the invention is described herein generally in terms of scheduling the transmission of IP data packets, persons skilled in the art should recognize that methods and apparatus can be envisioned that will transmit data packets that do not necessarily comply with IP standards without departing from the scope of the present invention.

Although the tumbler scheduling algorithm according to the present invention is described herein in terms of circular data structures, persons skilled in the art should recognize that the circular nature of the data structures represents the periodicity of scheduled appointments and that any number of alternative data structures which are not necessarily circular can be envisioned to implement the tumbler scheduling algorithm having required periodicity without departing from the scope of the present invention. For example, alternative embodiments of the invention can be implemented using sliding rectangular aligned arrays to implement a tumbler scheduling algorithm.

Although the present invention is described in terms of scheduling a transmission path between two endpoints, persons skilled in the art should recognize that alternative embodiments of the present invention can be envisioned which schedule a path between a plurality of transmitting endpoints and or a plurality of receiving endpoints without departing from the scope of the present invention.

Although the invention is shown and described with respect to an illustrative embodiment thereof, it should be appreciated that the foregoing and various other changes, omissions, and additions in the form and detail thereof could be implemented without departing from the spirit and scope of the underlying invention.

What is claimed is:

1. A method for delivering real time data across a network comprising the steps of:
   determining a packet flow schedule for at least one data packet to reach at least one node in a path across said network; and
   reserving bandwidth for use by said at least one packet in said path according to said packet flow schedule wherein said packet flow schedule is calculated to implement controlled delays in transmission of said at least one data packet between said at least one node, wherein a packet is intentionally delayed before begin transmitted in order to arrive at a destination at a preferred time, wherein each of said at least one node is associated with a dedicated transmit function schedule interval and a dedicated receive function schedule interval, wherein said reserving bandwidth further comprises utilizing historical data to maximize immediate use of a switch by rerouting packets through other switches in anticipation of an upcoming busy period as indicated by said historical data;
   determining an optimal path for said at least one data packet to travel in said network, wherein said determining an optimal path comprises:
      computing a fastest schedule through a network of switches; and
      accounting for delays in said switches and in nodes between said switches; and skewing receive appointment windows by an amount to accommodate a delay encountered along said path such that a delayed packet does not miss an assigned appointment and be declared unscheduled.

2. The method according to claim 1 further comprising the step of guaranteeing bandwidth for real-time transmission of said at least one data packet that are transmitted and delivered according to said schedule by guaranteeing time during which an application can place said at least one data packet into a transmission path.

3. The method according to claim 2 further comprising the step of allocating guaranteed bandwidth to multiple applications or multiple process threads.

4. The method according to claim 1 further comprising the step of:
communicating said packet flow schedule to said at least one node.

5. The method according to claim 1 wherein said packet flow schedules are maintained independently at each of said at least one node.

6. The method according to claim 1 further comprising the step of:
coordinating said schedules between a plurality of nodes.

7. The method according to claim 6 wherein each node is coordinated with a next node along said path to an endpoint receiver for an associated packet flow.

8. The method according to claim 6 wherein an endpoint transmitter coordinates its transmissions with all nodes along said path to an endpoint receiver.

9. The method according to claim 1 wherein said path across said network comprises an optimal path between an endpoint transmitter and an endpoint receiver.

10. The method according to claim 1 further comprising the step of:
incorporating said packet flow schedule in said at least one data packet.

11. The method according to claim 1 wherein unscheduled data is communicated through said network along with said at least one data packet that is transferred according to said packet flow schedule.

12. The method according to claim 1 wherein an endpoint transmitter coordinates its transmissions with all nodes along said path to an endpoint receiver; and
wherein said path across said network comprises an optimal path between said endpoint transmitter and said endpoint receiver.

13. A method for delivering real time data across a network comprising the steps of:

determining a packet flow schedule for at least one data packet to reach at least one node in a path across said network, wherein each of said at least one node is associated with a dedicated transmit function schedule interval and a dedicated receive function schedule interval;

reserving bandwidth for use by said at least one packet in said path according to said packet flow schedule wherein said packet flow schedule is calculated to implement controlled delays in transmission of said at least one data packet between said at least one node, wherein a packet is intentionally delayed before begin transmitted in order to arrive at a destination at a preferred time, wherein said reserving bandwidth further comprises utilizing historical data to maximize immediate use of a switch by rerouting packets through other switches in anticipation of an upcoming busy period as indicated by said historical data;

guaranteeing bandwidth for real-time transmission of said at least one data packet that are transmitted and delivered according to said schedule by guaranteeing time during which an application can place said at least one data packet into a transmission path;

allocating guaranteed bandwidth to multiple applications or multiple process threads;

determining an optimal path for said at least one data packet to travel in said network by computing a fastest schedule through a network of switches and accounting for delays in said switches and in nodes between said switches;

incorporating said packet flow schedule in said at least one data packet;

communicating said packet flow schedule to said at least one node;

independently maintaining said packet flow schedules at each of said at least one node;

coordinating said schedules between a plurality of nodes by coordinating each node with a next node along said path to an endpoint receiver for an associated packet flow; and skewing receive appointment windows by an amount to accommodate a delay encountered along said path such that a delayed packet does not miss an assigned appointment and be declared unscheduled.

14. The method of claim 13 wherein said controlled delays account for said delays in said switches and in nodes between said switches.

* * * * *